(12) United States Patent
Bangser et al.

(10) Patent No.: US 12,318,747 B2
(45) Date of Patent: *Jun. 3, 2025

(54) BLENDER APPARATUS WITH SAFETY INTERLOCK SYSTEM

(71) Applicant: BEAST HEALTH, LLC, Pacific Palisades, CA (US)

(72) Inventors: Benjamin Bangser, Los Angeles, CA (US); Gregory Thune, Los Angeles, CA (US); Colin Sapire, Pacific Palisades, CA (US)

(73) Assignee: BEAST HEALTH, LLC, Pacific Palisades, CA (US)

( * ) Notice: Subject to any disclaimer, the term of this patent is extended or adjusted under 35 U.S.C. 154(b) by 862 days.

This patent is subject to a terminal disclaimer.

(21) Appl. No.: 17/508,889

(22) Filed: Oct. 22, 2021

(65) Prior Publication Data

US 2022/0039600 A1    Feb. 10, 2022

Related U.S. Application Data

(63) Continuation of application No. 17/292,327, filed as application No. PCT/US2020/025701 on Mar. 30, 2020, now Pat. No. 11,272,812.

(Continued)

(51) Int. Cl.
A47J 43/07    (2006.01)
A47J 43/046   (2006.01)
(Continued)

(52) U.S. Cl.
CPC ......... *B01F 35/6052* (2022.01); *A47J 43/046* (2013.01); *A47J 43/0716* (2013.01);
(Continued)

(58) Field of Classification Search
CPC .................................................. A47J 43/0761
(Continued)

(56) References Cited

U.S. PATENT DOCUMENTS

| 5,863,118 A | 1/1999 | Ackels et al. |
| 6,350,053 B1 | 2/2002 | Morin |

(Continued)

FOREIGN PATENT DOCUMENTS

| AU | 0429585 A | 9/1985 |
| CN | 101404918 U | 4/2009 |

(Continued)

OTHER PUBLICATIONS

Google machine translation for CN-207590559-U (Year 2018).

(Continued)

*Primary Examiner* — David L Sorkin
(74) *Attorney, Agent, or Firm* — ALSTON & BIRD LLP

(57) ABSTRACT

A blending device having an interlock system which may comprise a plurality of subassemblies. A thermal detector may be configured to be proximity with matter being blended for human consumption. Interlock system may further include a blade interlock contact and a compressive contact. The blender vessel may be configured to compress the compressive contact to a communicative configuration when connected with the blade assembly. Interlock system may utilize a blender base assembly that has base interlock contacts and a motor. The blade assembly may be configured to releasably mount to the blender base assembly and may cause the base interlock contact and the blade interlock contact to come into electrical communication with each other. The interlock system may ultimately result in the motor being obstructed from operation unless certain conditions are met. The interlock system may further utilize one or more than one logic circuit element.

18 Claims, 18 Drawing Sheets

Related U.S. Application Data

(60) Provisional application No. 62/897,077, filed on Sep. 6, 2019.

(51) Int. Cl.
  | | |
  |---|---|
  | *B01F 27/808* | (2022.01) |
  | *B01F 27/88* | (2022.01) |
  | *B01F 35/00* | (2022.01) |
  | *B01F 35/21* | (2022.01) |
  | *B01F 35/31* | (2022.01) |
  | *B01F 35/60* | (2022.01) |
  | *B01F 35/32* | (2022.01) |
  | *B01F 101/00* | (2022.01) |

(52) U.S. Cl.
  CPC ....... *A47J 43/0722* (2013.01); *A47J 43/0761* (2013.01); *A47J 43/0766* (2013.01); *B01F 27/808* (2022.01); *B01F 27/88* (2022.01); *B01F 35/165* (2022.01); *B01F 35/2115* (2022.01); *B01F 35/31* (2022.01); *B01F 35/3213* (2022.01); *B01F 2101/1805* (2022.01)

(58) Field of Classification Search
  USPC .................................................. 366/145, 206
  See application file for complete search history.

(56) References Cited

U.S. PATENT DOCUMENTS

| | | | |
|---|---|---|---|
| 6,513,967 B2 | 2/2003 | Masip et al. | |
| 6,632,013 B2 | 10/2003 | Wulf et al. | |
| D487,668 S | 3/2004 | Sands | |
| D519,312 S | 4/2006 | Tsai | |
| D536,216 S | 2/2007 | Sands | |
| 7,220,049 B2 | 5/2007 | Lee | |
| D559,036 S | 1/2008 | Hayes et al. | |
| 7,690,592 B2 | 4/2010 | Ferraby | |
| 7,712,951 B2 | 5/2010 | Bohannon, Jr. et al. | |
| 7,871,195 B2 | 1/2011 | Larsen et al. | |
| 7,909,501 B2 | 3/2011 | Eden | |
| 7,950,842 B2 | 5/2011 | Pryor, Jr. et al. | |
| 8,042,990 B2 | 10/2011 | Pryir, Jr. et al. | |
| 8,403,555 B2 | 3/2013 | Wu | |
| 8,800,905 B2 | 8/2014 | Lee et al. | |
| D734,988 S | 7/2015 | Smith | |
| 9,089,238 B2* | 7/2015 | Lin | A47J 27/004 |
| D737,629 S | 9/2015 | Sands | |
| 9,370,280 B2 | 6/2016 | Conti | |
| 9,380,913 B2 | 7/2016 | Golino | |
| 9,420,915 B2 | 8/2016 | Dickson, Jr. et al. | |
| D767,334 S | 9/2016 | Pan | |
| 9,687,111 B1 | 6/2017 | Trojan | |
| D800,499 S | 10/2017 | Repac | |
| 9,839,326 B2 | 12/2017 | Sapire | |
| 9,855,535 B2 | 1/2018 | Arnett et al. | |
| D822,437 S | 7/2018 | Hosey et al. | |
| 10,182,682 B2 | 1/2019 | Ochoa et al. | |
| 10,264,923 B2 | 4/2019 | Cartei et al. | |
| 10,327,594 B2* | 6/2019 | Ivarsson | A47J 27/004 |
| 10,376,102 B2 | 8/2019 | Bock et al. | |
| D859,064 S | 9/2019 | Lee et al. | |
| 10,413,130 B2 | 9/2019 | Vu et al. | |
| 11,272,812 B2* | 3/2022 | Bangser | A47J 43/0761 |
| 2004/0042338 A1 | 3/2004 | Wu | |
| 2006/0028912 A1 | 2/2006 | Lee | |
| 2007/0183256 A1 | 8/2007 | Sands | |
| 2008/0230639 A1 | 9/2008 | Ferraby | |
| 2008/0264270 A1* | 10/2008 | Peng | A47J 43/0716 99/485 |
| 2010/0246319 A1 | 9/2010 | Pryor, Jr. et al. | |
| 2011/0248108 A1 | 10/2011 | Carriere | |
| 2011/0262600 A1 | 10/2011 | McGill | |
| 2012/0205475 A1 | 8/2012 | Wu | |
| 2013/0074706 A1 | 3/2013 | Fevre et al. | |
| 2015/0098299 A1 | 4/2015 | Sapire | |
| 2015/0101491 A1* | 4/2015 | Lin | A47J 27/004 99/348 |
| 2015/0165402 A1* | 6/2015 | King | B01F 35/32025 366/145 |
| 2017/0071413 A1* | 3/2017 | Park | A47J 27/004 |
| 2017/0224168 A1 | 8/2017 | Lin et al. | |
| 2018/0140137 A1 | 5/2018 | Barnard et al. | |
| 2018/0236421 A1 | 8/2018 | Hoare et al. | |
| 2019/0261815 A1 | 8/2019 | Elgaaen et al. | |
| 2022/0273141 A1* | 9/2022 | Atinaja | A23L 5/15 |

FOREIGN PATENT DOCUMENTS

| | | |
|---|---|---|
| CN | 203736058 U | 7/2014 |
| CN | 107427797 A | 12/2017 |
| CN | 207590559 U | 7/2018 |
| CN | 208435404 U | 1/2019 |
| CN | 208725551 U | 4/2019 |
| EP | 2486833 A1 | 8/2012 |
| GB | 2398733 A | 9/2004 |
| JP | H 0315884 A | 1/1991 |
| KR | 200436671 Y1 | 9/2007 |
| KR | 20110009558 U | 10/2011 |
| KR | 200474168 Y1 | 8/2014 |
| KR | 20170096383 A | 8/2017 |
| WO | WO-2017/063962 A1 | 4/2017 |

OTHER PUBLICATIONS

Google machine translation for CN-208435404-U (Year 2019).
1st Office Action for China Patent Application No. 202080073382.4 dated Sep. 27, 2023 w/English translation (6 pages).
Supplementary European Search Report for EP Patent Application No. 20860489.2 dated Oct. 10, 2023 (8 pages).
International Search Report and Written Opinion (ISA/US) for PCT/US2020/025701 mailed Jun. 29, 2020 (8 pages).
International Search Report and Written Opinion (ISA/CN) for PCT/CN2020/113845 mailed Nov. 30, 2020 (10 pages).
U.S. Appl. No. 17/292,327, filed May 7, 2021, 2021/0353103, Allowed.

* cited by examiner

BLENDER APPARATUS WITH SAFETY INTERLOCK SYSTEM

RELATED APPLICATIONS

This application is a continuation patent application of U.S. patent application Ser. No. 17/292,327, filed May 7, 2021, which is a National Stage Application, filed under 35 U.S.C. § 371, of International Patent Application No. PCT/US2020/025701, filed Mar. 30, 2020, which International Application claims the benefit of U.S. Provisional Application No. 62/897,077, filed Sep. 6, 2019; the contents of all of which are incorporated herein by reference in their entirety.

TECHNICAL FIELD

The disclosure herein relates generally to household and kitchen appliances. In particular, this disclosure relates to blending devices and food processing devices having an electronic safety interlock system. More particularly, the disclosure relates to devices and apparatuses to facilitate the blending and processing of foodstuff for human consumption wherein electromotive power is utilized and thus necessitating an electronic safety interlock system being designed for incorporation into the blending device to enhance the safe operation of the blending device and reduce risk to the end-users.

BACKGROUND

Many devices used to blend food and beverages have been developed over the years. These devices commonly have features and options to suit a wide variety of food preparation and beverage making needs. An ever-increasing number of blenders appear to be that of compact, personal-size (serving one or two persons) blenders. A common feature of these personal-sized blenders is that of sealed blending in a cup shape vessel, with a blade assembly screwed, or mounted to the cup creating a liquid-tight seal. This assembly is then inverted and placed onto a blender base assembly where blending may occur. One advantage of these types of personal size closed system blenders is that a consumer can drink from the cup shape vessel directly after blending thereby reducing the need to use additional drinking containers and saving on clean up time.

These personal-size blenders commonly have a large motor and can blend hard and dense foods with relative ease due to the high power output. One problem with these blenders tends to be safety. When compact, personal-sized blenders increase power output, the higher power typically translates to increased heat output, which then leads to a risk of overheating. Such overheating can further result in the blender vessel becoming pressurized. Due to the blade assembly being mounted on the blending vessel, this built-up pressure may have no method of escape from the blender vessel other than through explosive force. Unfortunately, due to the compact size of these personal blenders, there are also few options for heat dissipation while the blenders are in operation which may preemptively reduce pressure buildup. This pressure buildup can result in a user's safety being compromised while the blender is in operation or when attempting to uncouple the blender blade holder from the blending vessel.

Potential hazards posed to a user from a pressurized blender vessel include a serious risk of explosion. Such an explosion results in burns from liquids spilling and blender parts flying off of the blender causing injury. Particularly dangerous is that of the blade holder position relative to a user, in that the blade holder can come flying off of the blender vessel first, causing lacerations and puncture wounds to those around the blender from the blender blades. Overheating can further result in permanent damage to the motor, heating the foods or liquids beyond what is desired by a consumer, and cause unpleasant smells and odors from charred motor components. When the blending vessel becomes pressurized due to heat buildup, the one safe method of opening the vessel is to wait for the heat to lower and the pressure to neutralize inside the blender vessel which only serves to further frustrate an end consumer.

Sometimes, sacrifices are made on power to save on cost as an alternative. But, these consumers still attempt to blend dense and hard foods, but do so with a blender that is underpowered for the task. Blenders that utilize a motor that is underpowered for blending such hard and dense foods may result in unsatisfactory blending and premature wear and tear on the blender parts.

Moreover, previous blenders still appear to rely on an internal blending vessel geometry which consists of four corners, points, or fins. These four areas are typically designed to narrow or constrict the blending area toward the blade in an effort to produce a vortex. The vortex is important to any decent blend process and effectively cycles blending material through the vessel. But, the above-mentioned design is an outdated method of producing a blending vortex which results in needlessly occupying space inside the blender vessel. The common personal-sized blenders suffer even further due to not having the luxury of starting with a larger sized blender vessel initially.

Further, there is an apparent lack of blenders which incorporate an infuser system as part of the design. While infusers are known in the marketplace, many have been devised as standalone infusion systems. These systems utilize a variety of possible ingredients that typically lend themselves well for infusion, for example, tea and coffee. The infusers tend to operate with a vessel or container filled with water and typically have perforations which permit small particles, flavonoids, and vitamins to disperse throughout the water, and further include some type of chain or latch which permits a user to lift the infuser out of the water. These standalone systems tend to have many parts that become lost or break due to repeated uses and the fragile nature of these systems. For example, a chain may break, parts can become bent, or the lid may become lost. Moreover, these infuser designs typically do not lend themselves for serving the purposes of daily hydration. Not only do they fail commonly with daily heavy use, but the infused components are also commonly caffeinated, which only serves to exacerbate dehydration.

What is needed is a blender that is powerful enough to blend hard and dense food with ease yet is also safe and has a blending vessel that is highly efficient for the end consumer without the loss of internal blending space. Moreover, the end consumer should not be required to compromise his or her safety for higher-powered sealed single-serve blenders. The blender should still be capable of the uses for which the consumer may put the blender. Such a blender may be one in which overheating is solved via failsafe methods, and thus safety hazards from pressurization due to overheating of the sealed blending vessel are dealt with without relying on user actions or inputs. The end consumer should not be put at risk for a blender's inability to regulate heat input to a blended food. There also exists a need to have an incorporated infusion system within the blender which can infuse a wide variety of foods, not just tea or coffee and may assist in maintaining adequate osmoregulation.

SUMMARY

This disclosure herein may relate to a blending device which may comprise a blender vessel, a blade assembly, a blender base assembly, and a thermal detector, each of which may contribute to an interlock system and assembly. The thermal detector may be configured to be in detective proximity with a matter being blended and the matter being blended may include a wide variety of foodstuffs meant for human consumption. The interlock system and assembly may further include a blade interlock contact and a compressive contact. The blender vessel may be configured to compress the compressive contact to a communicative configuration when reversibly engaged with the blade assembly. The interlock system and assembly may further utilize a blender base assembly which has base interlock contacts and a motor. The blade assembly may be configured to releasably mount to the blender base assembly and in doing so may cause the base interlock contact and the blade interlock contact to come into electrical communication with each other. Accordingly, the interlock system and assembly may result in the motor being obstructed from being in electricity-receiving communication with a power source.

This disclosure may also describe a food processing device, additionally referred to as a blending device, which may have an electrical interlock system which may have a blender vessel and a blade assembly. The blade assembly may have a housing logic circuit element, a compressive contact, and a blade interlock contacts. The blender vessel may be configured to reversibly engage with the compressive contact, and the compressive contact may be biased to an off configuration when not reversibly engaged to the blender vessel, and biased to an on configuration when reversibly engaged to the blender vessel. The reversible engagement may cause the compressive contact to transition to an on configuration. The transitioning may permit an electric signal to be transmissible to the housing logic circuit element. The blade assembly may further have a thermal detector. The thermal detector may be located in detective proximity with a blending matter and configured to be in electrical communication with the housing logic circuit element. The food processing device may also have a blender base assembly which may include a motor, a base interlock contact, and a one or more than one logic circuit element. The blender base assembly may be configured to reversibly couple with the blade assembly. The reversible coupling may result in the blade interlock contact being in electronic communication with the base interlock contacts. The interlock assembly and system may result in a configuration for the motor which may result in operability when the compressive contact is configured to on, the thermal detector registers a temperature below a thermal maximum, and the blade interlock contact and base interlock contacts are in the aforementioned electronic communication with each other.

BRIEF DESCRIPTION OF THE DRAWINGS

Further advantages of the present disclosure may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
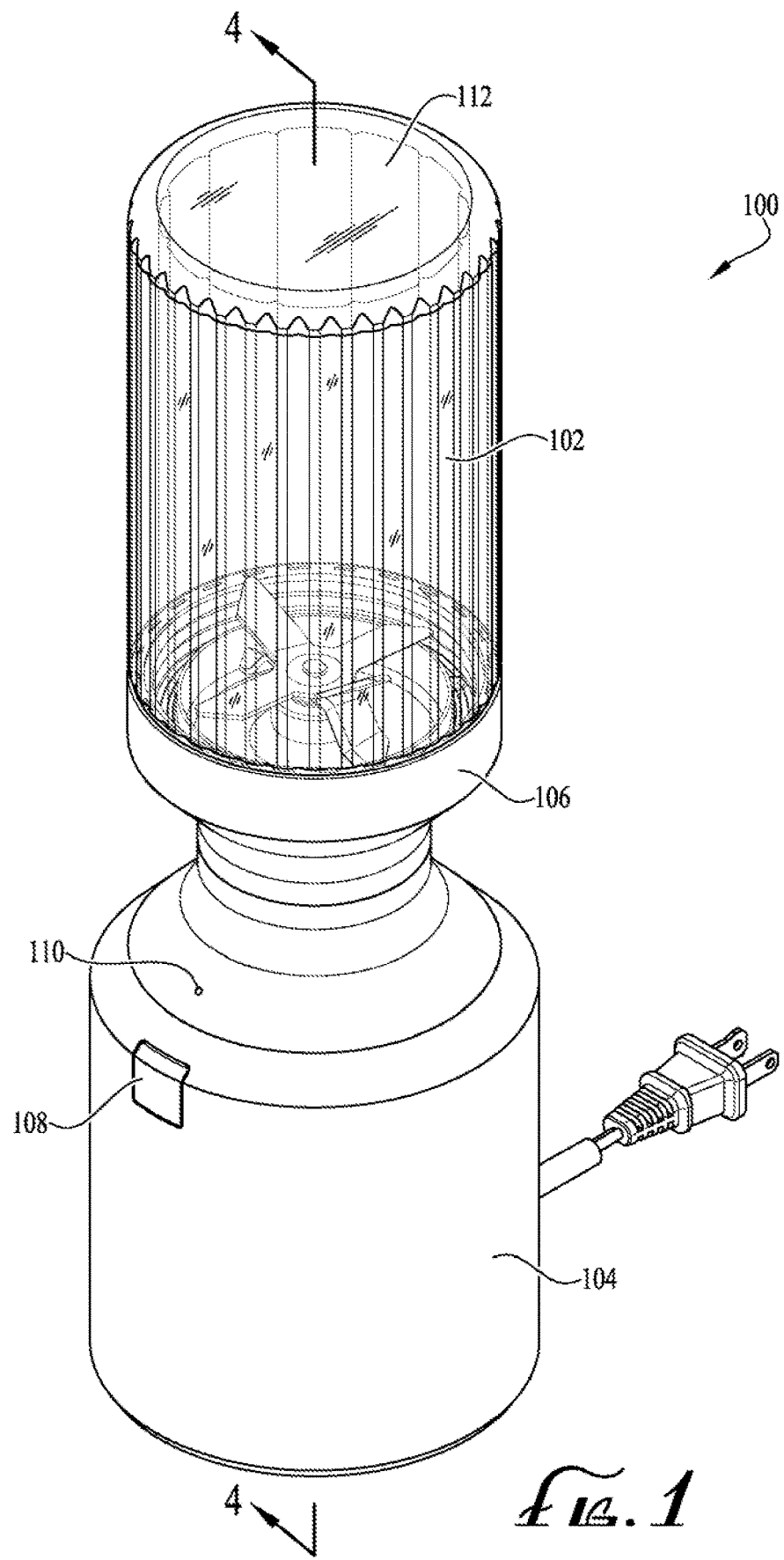
FIG. 1 is a perspective view of one non-limiting embodiment of a blending appliance.

Referring now to the drawings, like reference numerals designate identical or corresponding features throughout the several views. Further, described herein are certain non-limiting embodiments of a blending device 100 and infusion system 200.

FIG. 1 shows relevant portions of the blending device 100 which may include a blender vessel 102, a blender base assembly 104 (also referred to herein as blander base 104), a blade assembly 106 (also referred to herein as a blade housing 106), a power switch 108, and a status indicator 110. The blender base assembly 104 may be fully detachable with respect to the blade assembly 106 and the blender vessel 102. Further, the blender vessel 102 and the blade assembly 106 may be detachable from each other. The power switch 108 provides an on-off function with full depression for the blending device 100 and may further enable a pulsing function by half depression, quarter depression, or any fraction of depression other than full depression. In this way, the blending device 100 may be fully controlled in an instant on or instant off manner. Other methods of operation, as addressed below, are also contemplated. The status indicator 110 may indicate the state of the blending device 100 by indicating power is on, power is off, the power is used in a pulsing manner, or the power and thus the food blending device 100 is on standby. Further, the status indicator 110 may utilize a variety of lighting color schemes and/or light flashes for indicating the state of the blending device 100. The status indicator 110 may utilize light-emitting diodes for light production. The blender vessel 102 is contemplated to have a view port 112 at approximately the center of one side of the blender vessel 102. This may allow users of the food blending device 100 to view the material as it is being processed and blended.

Blender vessel 102 is contemplated to be constructed of glass, borosilicate glass, or any number of suitable plastics or thermoplastics such as co-polymers or co-polyesters, for example, polyethylene terephthalate or a combination assembly of plastic or thermoplastic or any combination therein. The blender base assembly 104, blade assembly 106, and blender blade 114 are contemplated to be constructed of a wide range of suitable lightweight materials, for example, plastics, thermoplastics, or a combination therein, and metals such as aluminum, zinc, or titanium. The blender blade 114 specifically may be constructed of more durable and heavyweight materials such as, but not limited to, stainless steel.

Figure 2:
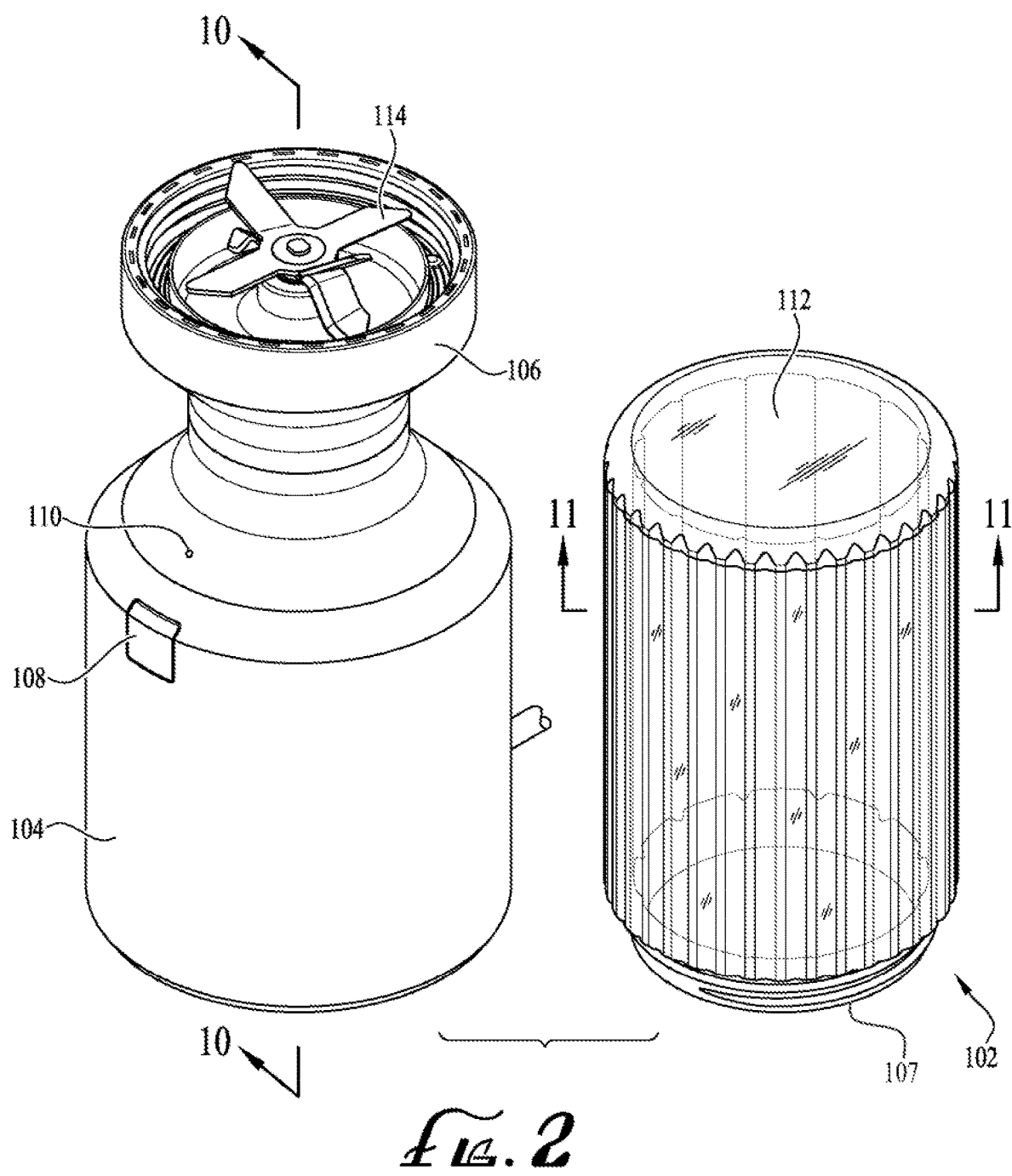
FIG. 2 is a perspective view of one non-limiting embodiment of a blending appliance with a blending vessel removed illustrating a blending blade.

FIG. 2 shows all of the preceding aspects and further illustrates the blender vessel 102 in a fully detached configuration from the blade assembly 106. The illustrated removal of the blender vessel 102 better illustrates the location of blender blade 114 as it may relate to the blender vessel 102. The blender vessel 102 and the blade assembly 106 may join together by way of threading located to one respective ends of each of the blender vessel 102 and the blade assembly 106. Further illustrated is that of the threaded end 107 of the blender vessel 102. The threading illustrated is by way of example only, and other connection methods are contemplated between the blender vessel 102 and the blade assembly 106, including clip type connection, bayonet type connection, friction fit type connections and other connections commonly used in the industry.

Figure 3:
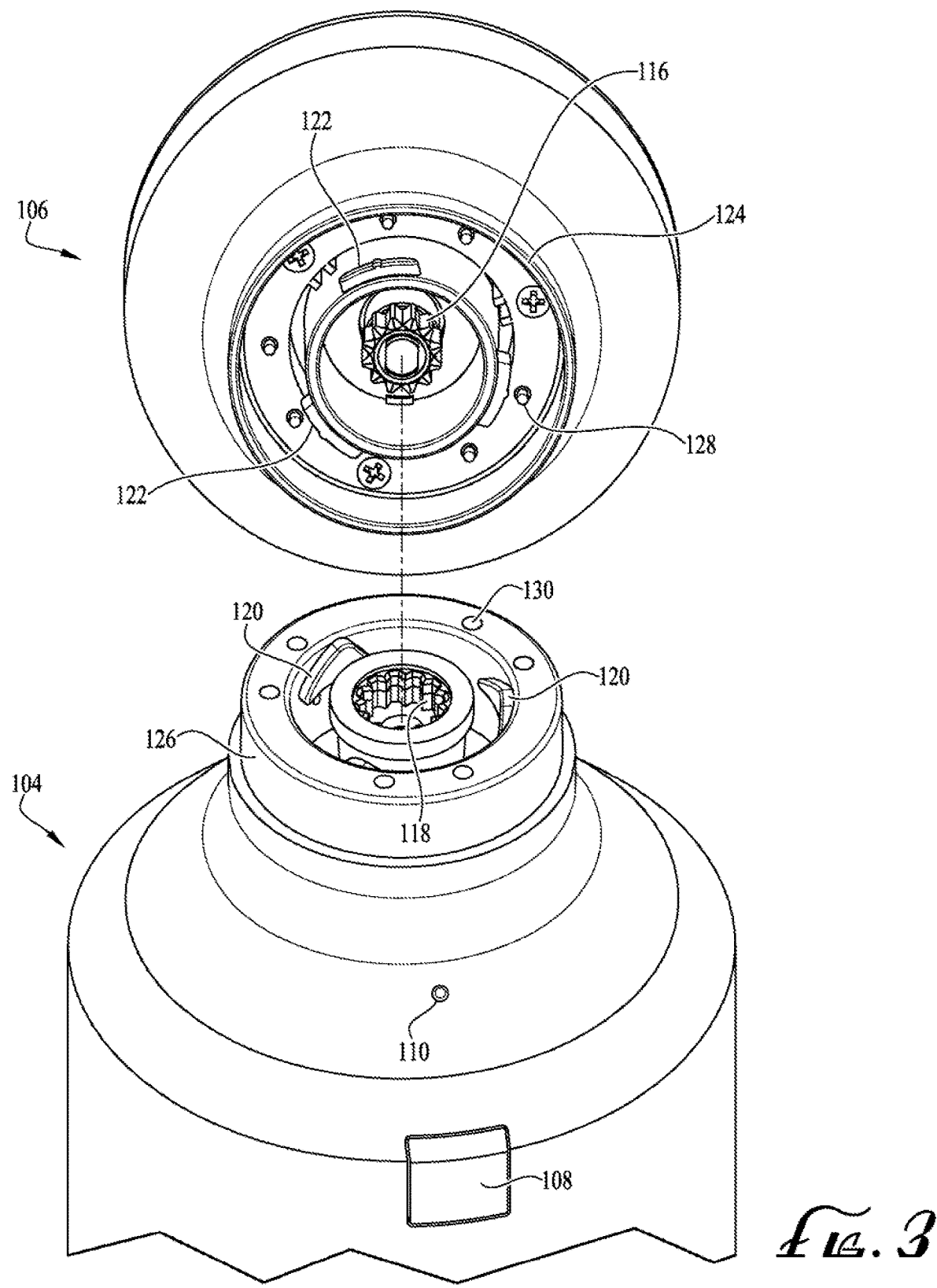
FIG. 3 is a perspective top view of a blending appliance base and a perspective bottom view of a blending blade assembly illustrating one potential mating between a blending base and a blending blade assembly.

FIG. 3 illustrates the blade assembly 106 lifted off of the blender base assembly 104. Illustrated on the blade assembly 106 is a male spline 116 and illustrated on the blender base assembly 104 is a female spline 118. This configuration may be contemplated to be in the reverse with the male spline 116 located to the blender base assembly 104 and the female spline 118 located to the blade assembly 106. The male spline 116 and the female spline 118 may mate together to provide rotational coupling between male spline 116 and female spline 118 which may be directly connected to the blender blade 114 (shown in FIG. 2).

Further illustrated in FIG. 3 are bayonet connectors 120 located to the blender base assembly 104 and locking protrusions 122 located to the blade assembly 106. The bayonet connectors 120 may permit alignment with the blender base assembly 104 and the locking protrusions 122 of the blade assembly 106 from any particular direction of application of blade assembly 106 to blender base assembly 104. The locking protrusions 122 may have any orientation with respect to the blender base assembly 104 and the bayonet connectors 120. The bayonet connectors 120 may cause a rotational auto-alignment between the blender base assembly 104 and blade assembly 106 such that the blade assembly 106 may rotate based on the downward slope of the bayonet connectors 120, based on the triangular shape of the bayonet connectors 120. Further, any shape for the bayonet connectors 120 are contemplated provided that a similar rotational auto-alignment feature may be achieved, for example, a half-circle.

An outer collar 124 may aid in guiding the blender base assembly 104 and the blade assembly 106 together such that the bayonet connectors 120 and the locking protrusions 122 may properly align for preparation of the auto-alignment. The outer collar 124 may fit around neck 126 such that the connection between the blender base assembly 104 and the blade assembly 106 may be secure and stable. After mounting the outer collar 124 of the blade assembly 106 over the neck 126 of the blender base assembly 104, the bayonet connectors 120 and the locking protrusions 122 may engage and auto-rotate the blade assembly 106 around the blender base assembly 104 permitting the blade assembly 106 to drop fully to the blender base assembly 104. A user then may lock the blade assembly 106 and the blender base assembly 104 together by twisting the blade assembly 106 with the blender vessel 102 attached to the blender vessel 102 such that the twisting motion locks the locking protrusions 122 under the bayonet connectors 120 of the blender base assembly 104.

Still referring to FIG. 3, shown are blade interlock contacts 128 and base interlock contacts 130. The blade interlock contacts 128 and the base interlock contacts 130 may be electronically conductive and thus may require current to function properly. Together, the base interlock contacts 130 and the blade interlock contacts 128 may form a portion of the electronic interlock system 151 (shown in FIG. 9). When the base interlock contacts 130 and the blade interlock contacts 128 are mated together and electronically connected, the electronic interlock system 151 (shown in FIG. 9) may then be placed closer to an operational status which represents the full operation of the blending device 100 and may further be indicated to do so by status indicator 110. Accordingly, one potential indicator of this may be that the status indicator 110 may become illuminated with a color that may be unique to this operational status. One preferred embodiment may include a multiplicity of base interlock contacts 130 on the blender base assembly 104 and a multiplicity of blade interlock contacts 128 on the blade assembly 106. Such an embodiment may further enhance the auto-alignment feature of the bayonet connectors 120 and the locking protrusions 122 such that a user may place the blade assembly 106 in any rotational configuration above and with respect to the blender base assembly 104. The base interlock contacts 130 and the blade interlock contacts 128 may still make contact in any rotational configuration and there may then be no front or back with respect to the blender vessel 102 as it is placed onto the blender base assembly 104.

Figure 4:
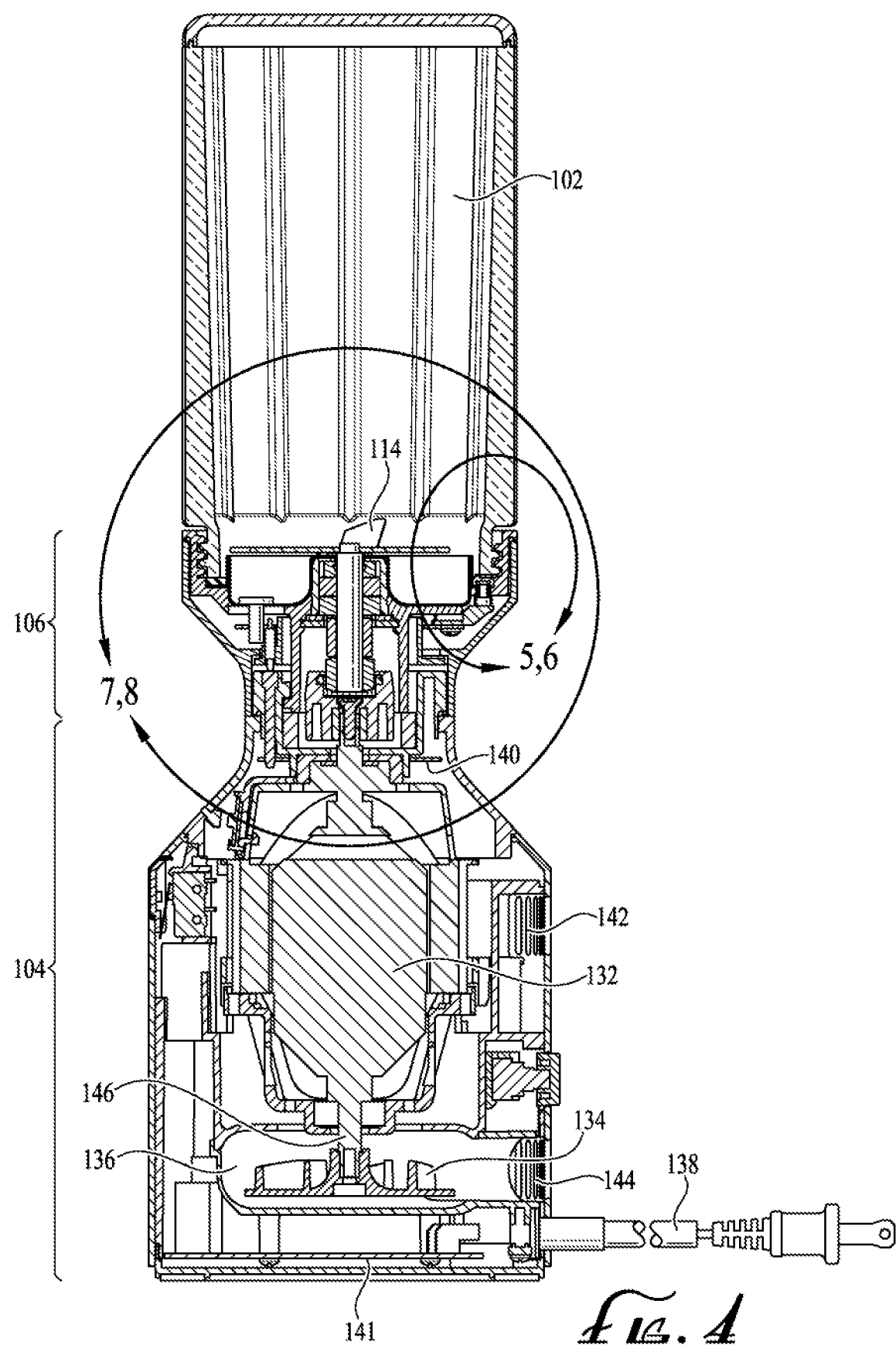
FIG. 4 is a cross-sectional view of a food blending device in an assembled configuration.

FIG. 4 indicates the internal components of the food blending device 100. Seen in conjunction with some previously illustrated components are a motor 132, a fan 134, a fan housing 136, and a power source 138 (power source may also herein be referred to as a power cord 138). The power source 138 may be a hard-wired cord, a removable cord that plugs into both the blender base assembly 104 and a standard wall outlet or battery pack, or any combination therein. The motor 132 may be contemplated to provide a wide range of power outputs, by way of example only, 300, 1000 or 1500 watts or any selected power rating inside or outside the stated range. Moreover, motor 132 may be contemplated to be brushless or may also be a brushed design. In some preferred embodiments, motor 132 may be 1000 watts and of a brushless configuration.

Further illustrated is a first logic circuit element 140 (also referred to as a first printed computer board 140) and a second logic circuit element 141 (also referred to as a second printed computer board 141). The first logic circuit element 140 and second logic circuit element 141 may support and electrically connect mechanical and/or electronic/electrical components using conductive tracks, pads, and other features and may be further etched from one or more sheet layers of copper laminated onto and/or between sheet layers of a non-conductive substrate as would be readily understood by those skilled in the art of manufacturing printed computer boards. Moreover, the first logic circuit element 140 and the second logic circuit element 141 may route signals coming from power switch 108, may route signals from various sensors of the food blending device 100, may route signals from an electronic interlock system 151 (illustrated in FIG. 9) and may generally connect electronic components of the blending device 100 together. Further, any identified printed computer board throughout this disclosure may be programmed to perform a wide variety of functions as related to blending.

The intake port 142 to the fan and the exhaust port 144 are further indicated in FIG. 4. The motor 132 may have a drive shaft 146 which may run through the motor 132. The drive shaft 146 may operate the fan 134 and the blender blade 114 simultaneously. The blender blade 114 may be driven by the female spline 118 which may be attached to the upper end of the drive shaft 146. The fan 134 may drive air current out of the exhaust port 144 thereby creating a vacuum towards the upper portion of the blender base assembly 104. The produced vacuum may then result in such decreased air pressure that air is then pushed into the intake port 142 by the ambient air pressure external to the blender base assembly 104. With continuous operation of the food blending device 100 via the motor 132 the air path (shown in FIG. 10) is thus circulated through the blender base assembly 104 to maintain appropriate operating temperatures for the blender base assembly 104 and the motor 132.

Figure 5:
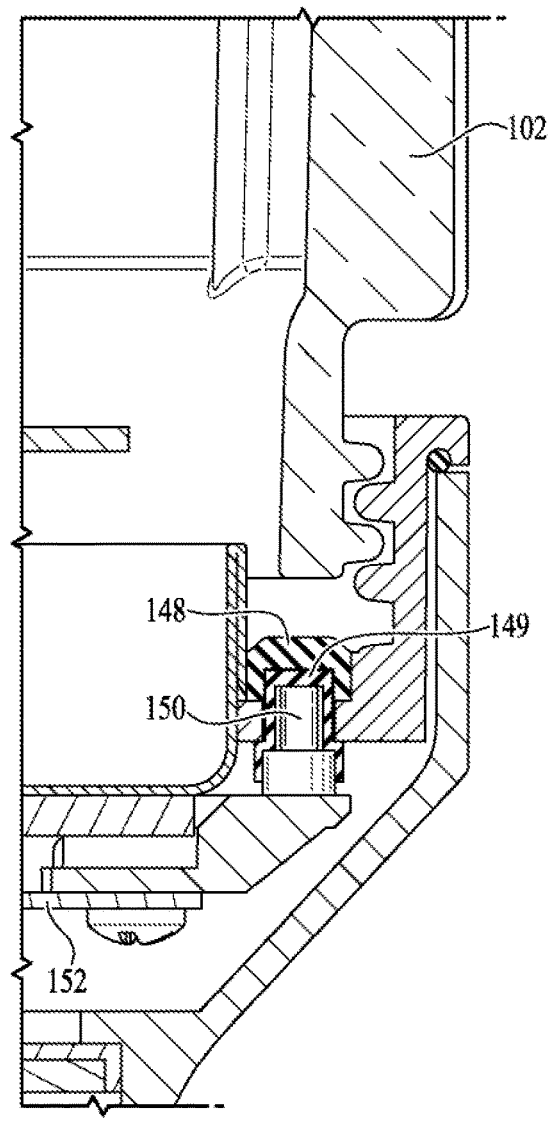
FIG. 5 is an enlarged portion of FIG. 4 wherein a compressive contact between a blender vessel and a blade assembly is in a disengaged configuration.
Figure 6:
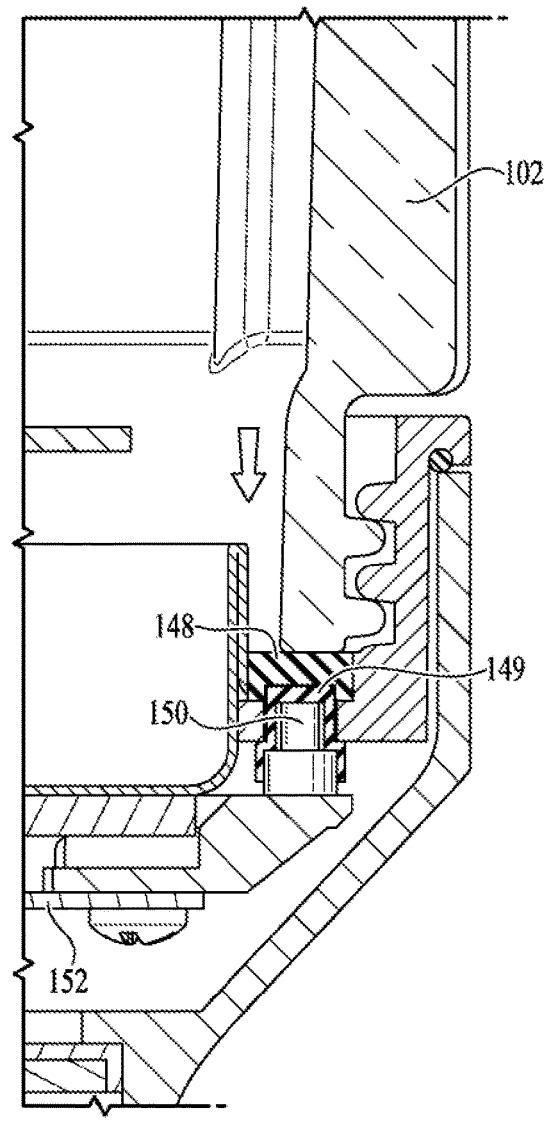
FIG. 6 is an enlarged portion of FIG. 4 wherein a compressive contact between a blender vessel and a blade assembly is in an engaged configuration.

FIGS. 5 and 6 illustrate how a portion of an electronic interlock system 151 (illustrated in FIG. 9) may operate. Seen in FIG. 5 is silicone gasket 148 located in a superior position to an actuator 149, which may be located in a superior position to a compressive contacts 150 (also referred to herein as spring loaded electrical contacts 150). The actuator 149 may be ring shaped and be circumferentially positioned between the silicone gasket 148 and the compressive contact 150. The blender vessel 102 may be threaded onto the blade assembly 106 which may depress the silicone gasket 148 and thereby depress the actuator 149 and the compressive contact 150 as illustrated in FIG. 6. Depression of the compressive contact 150 may result in a complete circuit with respect to the blender vessel 102 and the blade assembly 106 and communicate electronically with a housing logic circuit element 152 (also referred to herein as a housing printed computer board 152), which may then communicate with the other printed computer boards located to the blender base assembly 104 (shown in FIGS. 4 and 9). Further contemplated is that printed computer board 152 may, or may not have further programming, or may merely route electrical signals to other printed computer boards described herein. Any identified printed computer board throughout this disclosure may be programmed to perform a wide variety of functions as related to blending.

Figure 7:
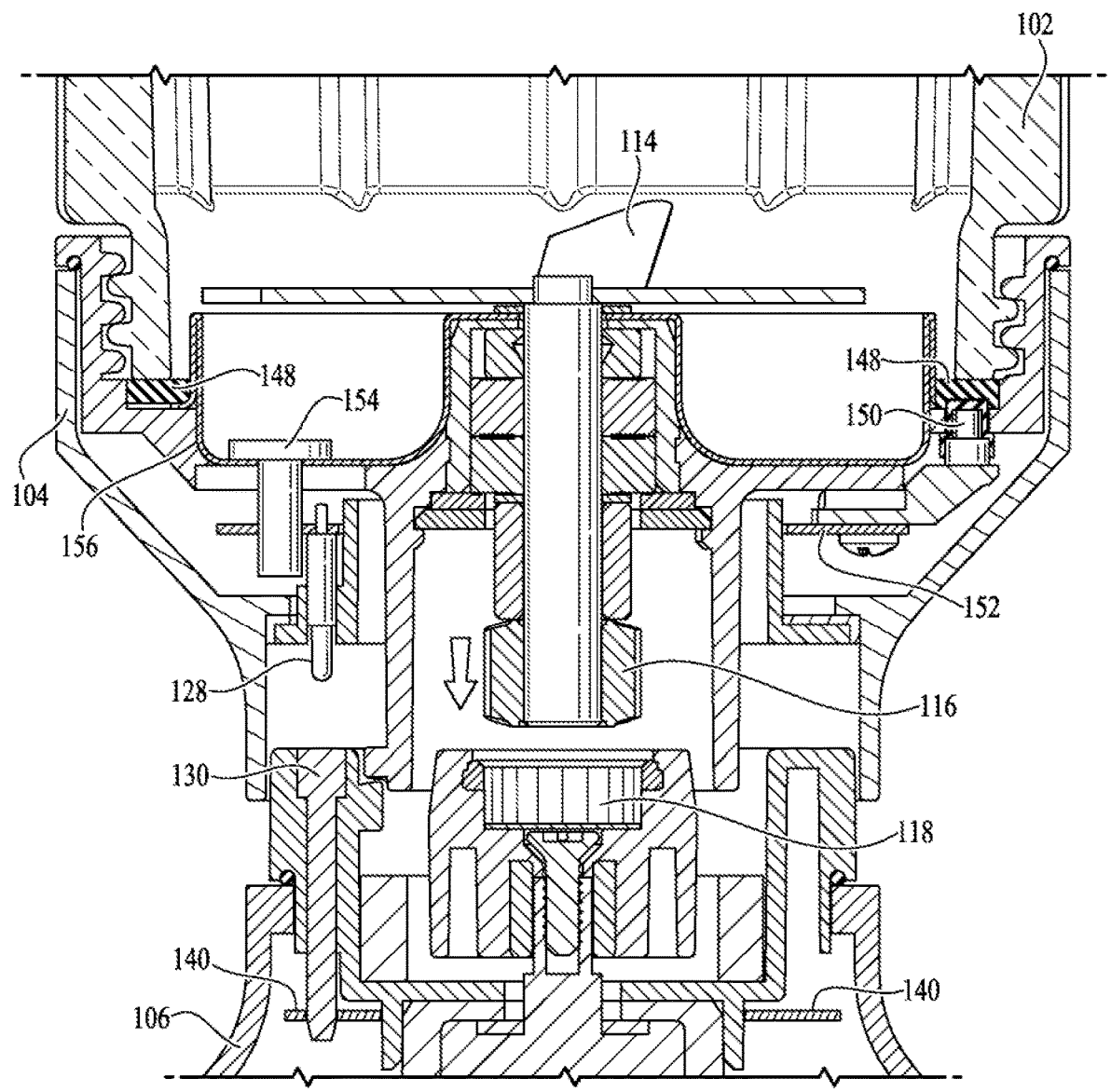
FIG. 7 is an enlarged portion view of FIG. 4 illustrating a disengaged coupling of a blender base assembly and a blade assembly.
Figure 8:
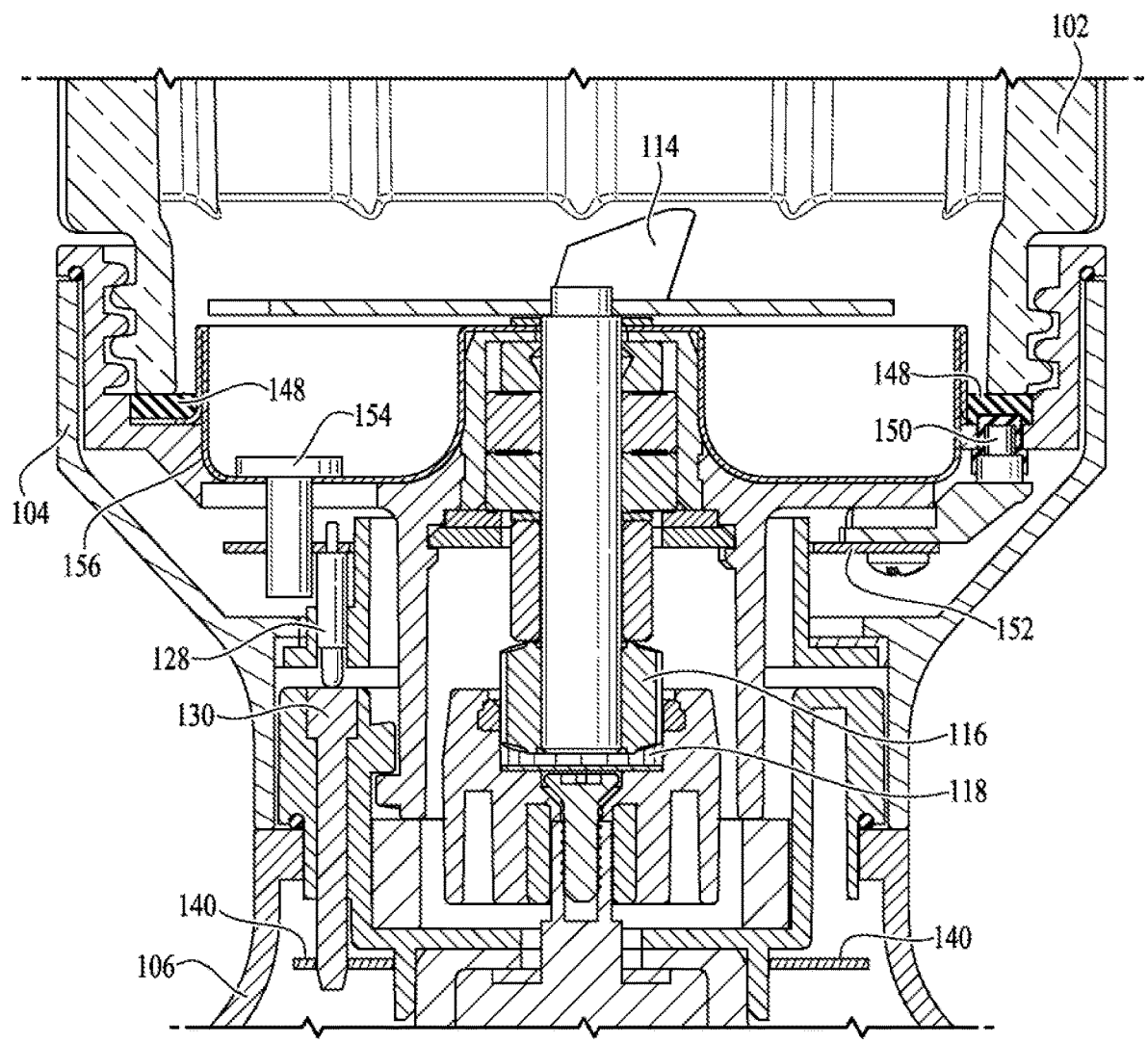
FIG. 8 is an enlarged portion view of FIG. 4 illustrating an engaged coupling of a blender base assembly and a blade assembly.

FIGS. 7 and 8 illustrates one potential embodiment of how the blender base assembly 104 and the blade assembly 106 may couple together for operation. Shown in FIG. 7 is a downward application of the blade assembly 106 to the blender base assembly 104. The male spline 116 of the blade assembly 106 may slot into the female spline 118 of the blender base assembly 104 as illustrated in FIG. 8. In this way, the motor 132 may then be physically and rotationally coupled with the shaft of the blender blade 114. Shown in FIG. 8 is contact between blade interlock contacts 128 and base interlock contacts 130. Such contact may be important for the electronic interlock system 151 (shown in FIG. 9).

Further illustrated is the thermal detector 154 located immediately adjacent to, and in a superior position with a lower wall 156 of the blade assembly 106. The proximity of the thermal detector 154 to the internally blended contents of the blender vessel 102 and blade assembly 106 may be preferred due to the accuracy of the readings while the blending device 100 is in operation. The thermal detector 154 may be physically connected to the housing logic circuit element 152 with conductive wiring such that the thermal detector 154 is connected to the electronic interlock system 151 (shown in FIG. 9). The thermal detector 154 may shut off the blending device 100 should a thermal maximum be reached. In doing so, the thermal detector 154 may be electrically conductive with blade interlock contact 128 (shown in FIG. 3) and base interlock contact 130 (shown in FIG. 3) such that a thermal maximum signal can be routed from thermal detector 154 to an appropriate printed computer board for power shut off. The thermal maximum may be any temperature predetermined by the manufacturers, for example, 60 to 100 degrees centigrade. Preferred embodiments may shut off power to blending device 100 between 65 and 75 degrees centigrade. In preferred embodiments, the thermal detector 154 may be contemplated to be a negative temperature coefficient thermistor. Other thermal detectors are contemplated, by way of example, a positive temperature coefficient thermistor, or any other variety of temperature detectors of which the resistance may be altered from ambient environmental temperature.

Figure 9:
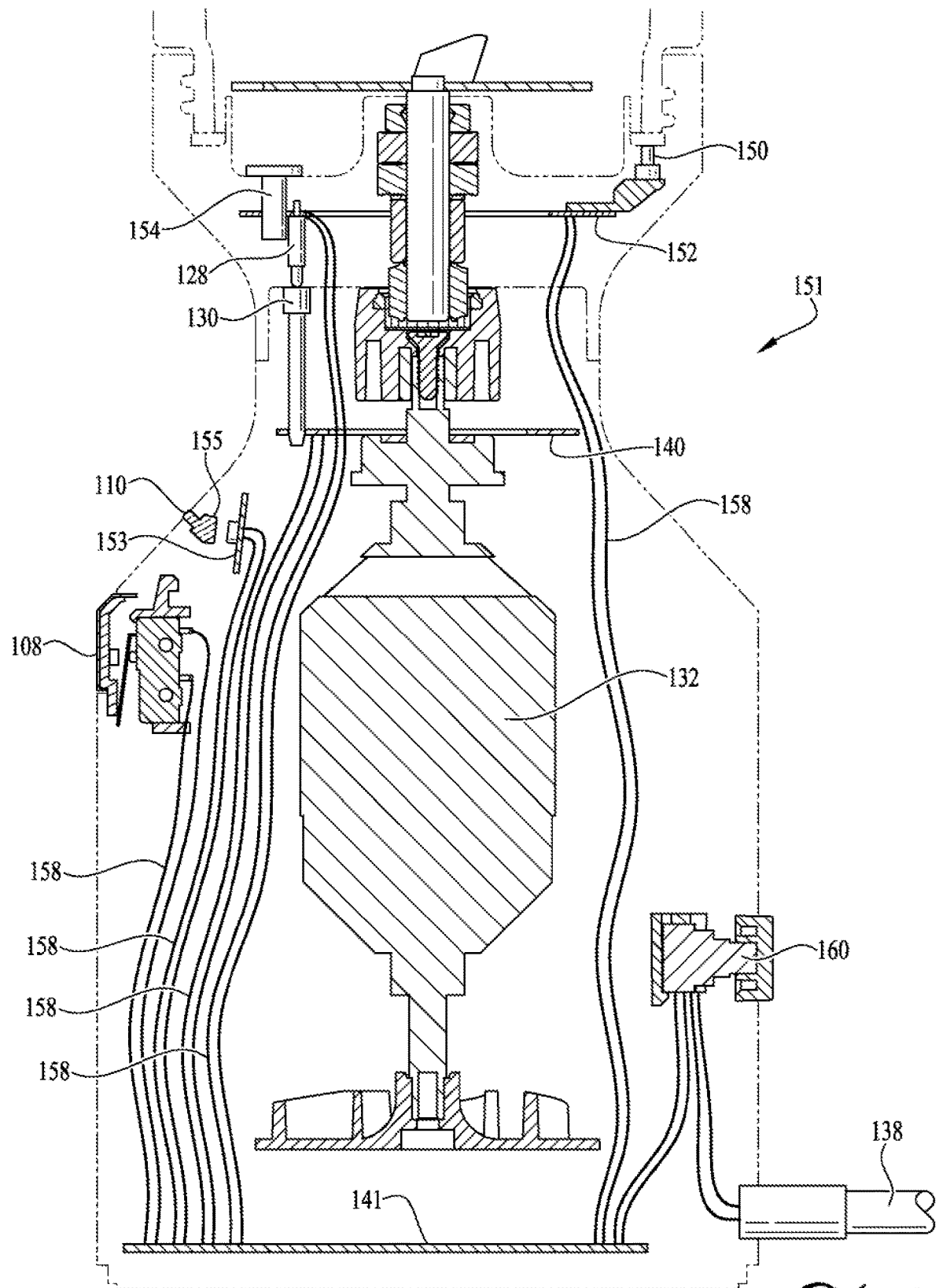
FIG. 9 is an enlarged diagrammatic cross-sectional view illustrating one non-limiting embodiment of an electronic interlock system.

Illustrated in FIG. 9 is an electronic interlock system 151. The components, as listed, may constitute the system as a whole, in partial, or less than the whole. Such components are the power switch 108, the status indicator 110, the blade interlock contacts 128, the base interlock contacts 130, the motor 132, the power source 138, a first logic circuit element 140, a second logic circuit element 141, compressive contact 150, housing logic circuit element 152, indicator logic circuit element 153 (also herein referred to as an indicator printed computer board 153), thermal detector 154, light pipe 155, wiring 158, and power cut switch 160. Accordingly, this list may not be exhaustive, nor is this list fully inclusive. Additional components are contemplated to be added to this list, and the blending device 100 electronic interlock system 151 may be contemplated to be operational with less than this full list. Moreover, the various logic circuit elements may collectively be referred to as one or more than one logic circuit element because the interlock system 151 may be contemplated to be operational with less than this full list. The wiring 158 is contemplated to be appropriately gauged wire for the application of the wire, and those skilled in the art will appreciate which gauge wire should be utilized to support the necessary electric current to operate or signal throughout the blending device 100. Moreover, the wiring 158 may connect all of the components such that the electronic interlock system 151 may operate appropriately. Any identified logic circuit element or printed computer board throughout this disclosure may be programmed to perform all of the mentioned functions within a single circuit element or may be programmed to perform only a portion of the mentioned tasks throughout this discloser, wherein those tasks may relate to a wide variety of functions as related to blending, food processing, or operating a small hand kitchen appliance.

Figure 10:
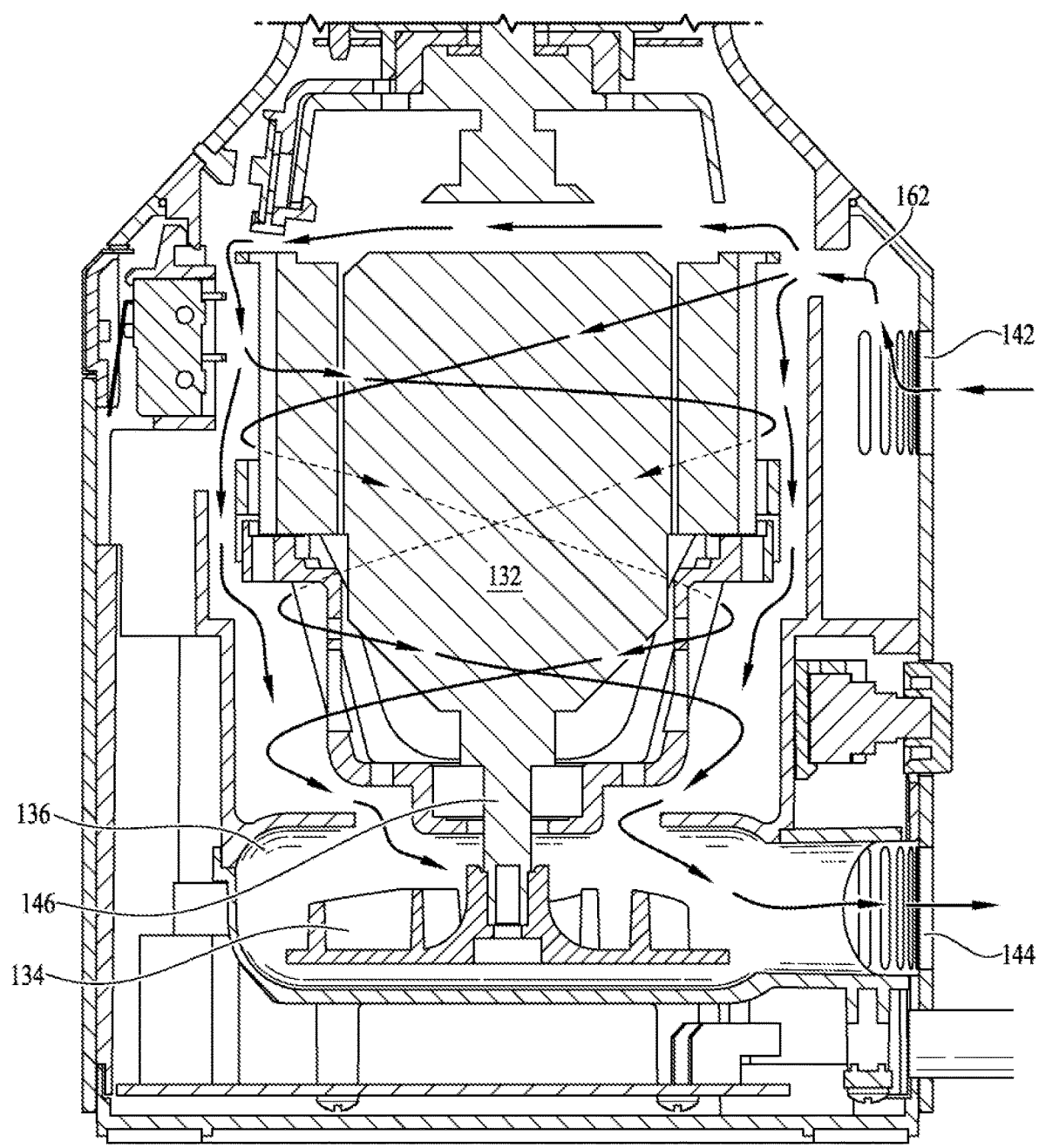
FIG. 10 is an enlarged diagrammatic cross-sectional plan view illustrating one non-limiting embodiment of airflow through a blender base.

FIG. 10 shows one potential embodiment for air flow through the blender base assembly 104. An air flow 162 is illustrated as a path through the blender base assembly 104. Accordingly, the air flow 162 initiates with the motor 132. As motor 132 begins to spin the drive shaft 146 the fan 134 also begins to move air. As previously described, the air may be expelled out of the exhaust port 144 thereby creating a vacuum towards the upper portion of the blender base assembly 104. The produced vacuum may then result in such decreased air pressure that air may then be pushed into the intake port 142 by the ambient air pressure external to the blender base assembly 104.

Air flow 162 shows the path may travel over the top of the motor 132 and under blade assembly 106, down a lateral side of motor 132, and to fan housing 136 wherein the air is pushed external to the blender base assembly 104. Air flow 162 may travel in both clockwise and counterclockwise directional flows and up through both right and left internal spaces to motor 132. Moreover, it is contemplated that additional intake port 142 and exhaust port 144 locations may be placed onto the external portion of the blender base assembly 104 to aid with air flow 162 and general cooling of motor 132. With continuous operation of the food blending device 100 via the motor 132 the air flow 162 is thus circulated through the blender base assembly 104 to maintain appropriate operating temperatures for the blender base assembly 104 and the motor 132. The air flow 162 may be such that quieter operation is achieved and therefore operation is gentler, produces less noise, and may generally be more satisfactory for the end user to operate.

Figure 11:
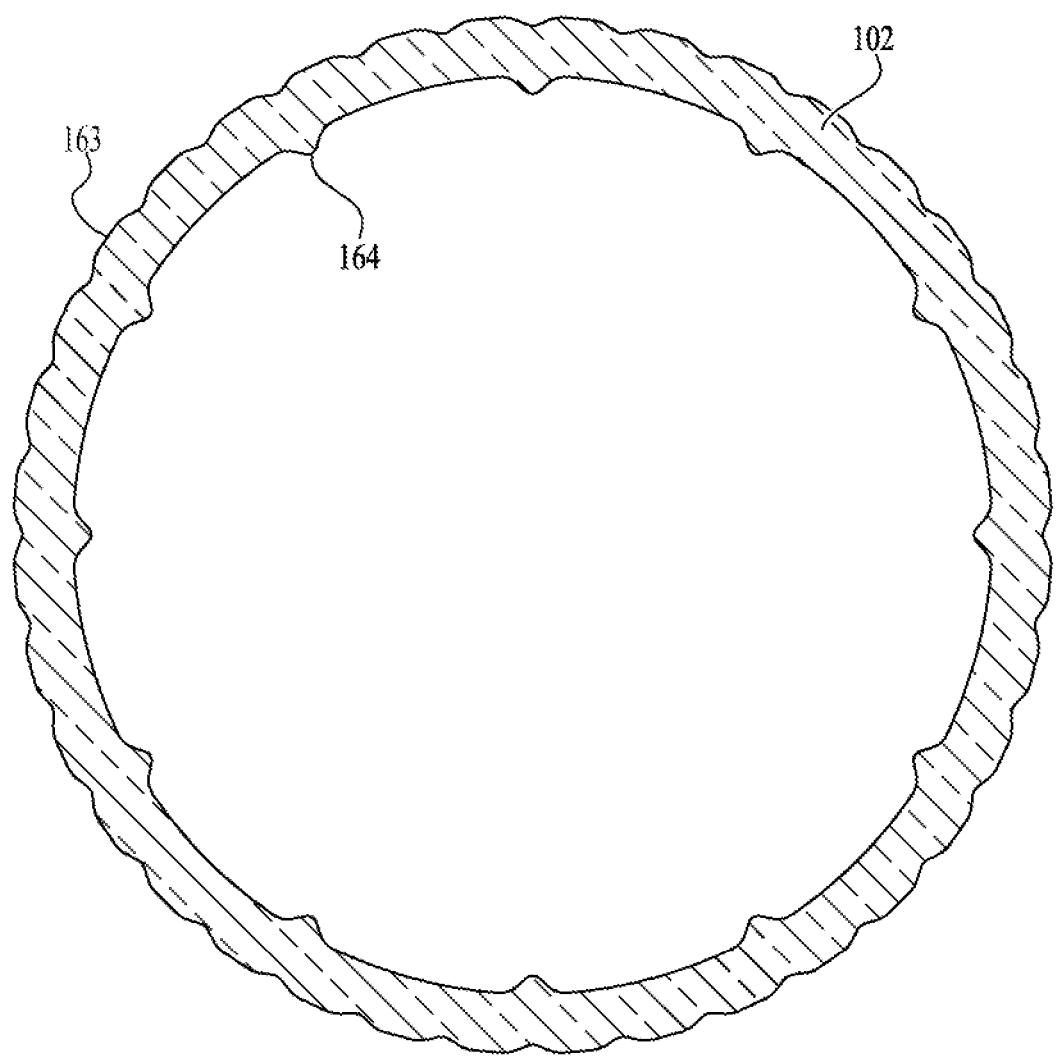
FIG. 11 is a cross-sectional view of one non-limiting embodiment of a blender vessel illustrating one non-limiting configuration of ribbing internal to the vessel.

FIG. 11 illustrates a cross-section view of blender vessel 102 such that the internal structure may be better understood. Shown internal to the blender vessel 102 are the circumferential wall 163 and ribs 164. Ribs 164 provides continuous agitation between materials being blended by blender blade 114 and the internal sidewall of the blender vessel 102. This continuous agitation is achieved by way of the ribs 164 disrupting a smooth path of the blended material as it travels circumferentially around internal to the blender vessel 102. Shown are a total of 12 ribs 164 internal to the blender vessel 102, however, a wide variety of ribs 164 are contemplated, by way of example only, the number of ribs may be as low as 5 or as high as 30. Preferred embodiments of the blender vessel 102 may have between 10 and 14 ribs. Testing has demonstrated that the application of an increased number of ribs 164 beyond that of common to the industry-standard use of 4 produces a superior, smoother, and more thoroughly broken-down material subsequent to the blending process. Testing has also demonstrated that the use of too many ribs 164 may result in cleaning issues, as not all of the spaces between ribs 164 may be readily accessible. Moreover, the nature of a circumferential wall 163 creates even distribution of forces between the blender blades 114 (seen in FIG. 2) and the ribs 164.

Figure 12:
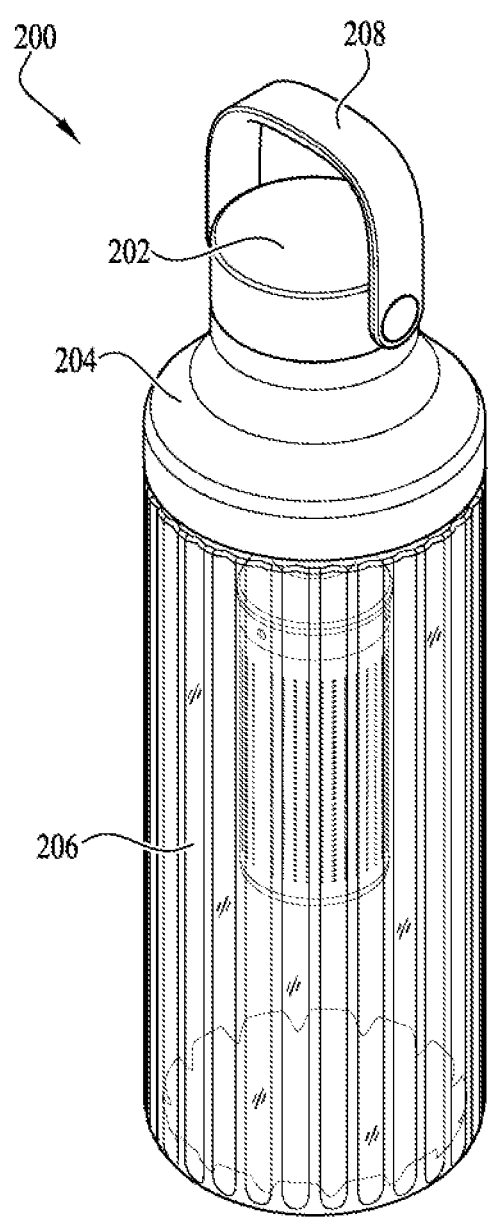
FIG. 12 is a perspective view one non-limiting embodiment of a blender vessel with a cap and a diffusion system internal to the vessel.
Figure 13:
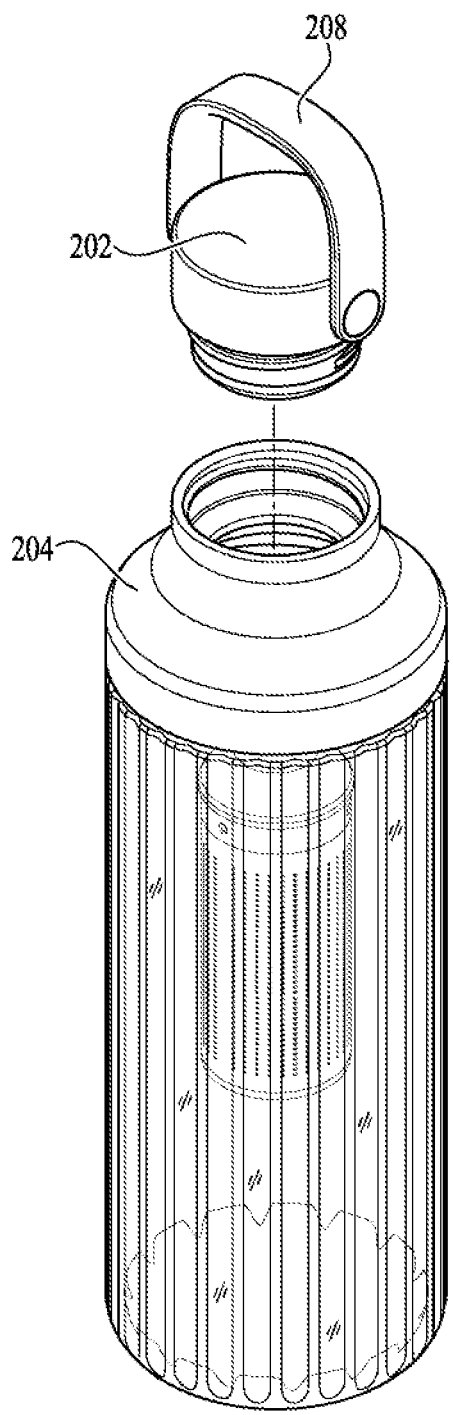
FIG. 13 is a perspective view of a blender vessel with the removal of a cap.
Figure 14:
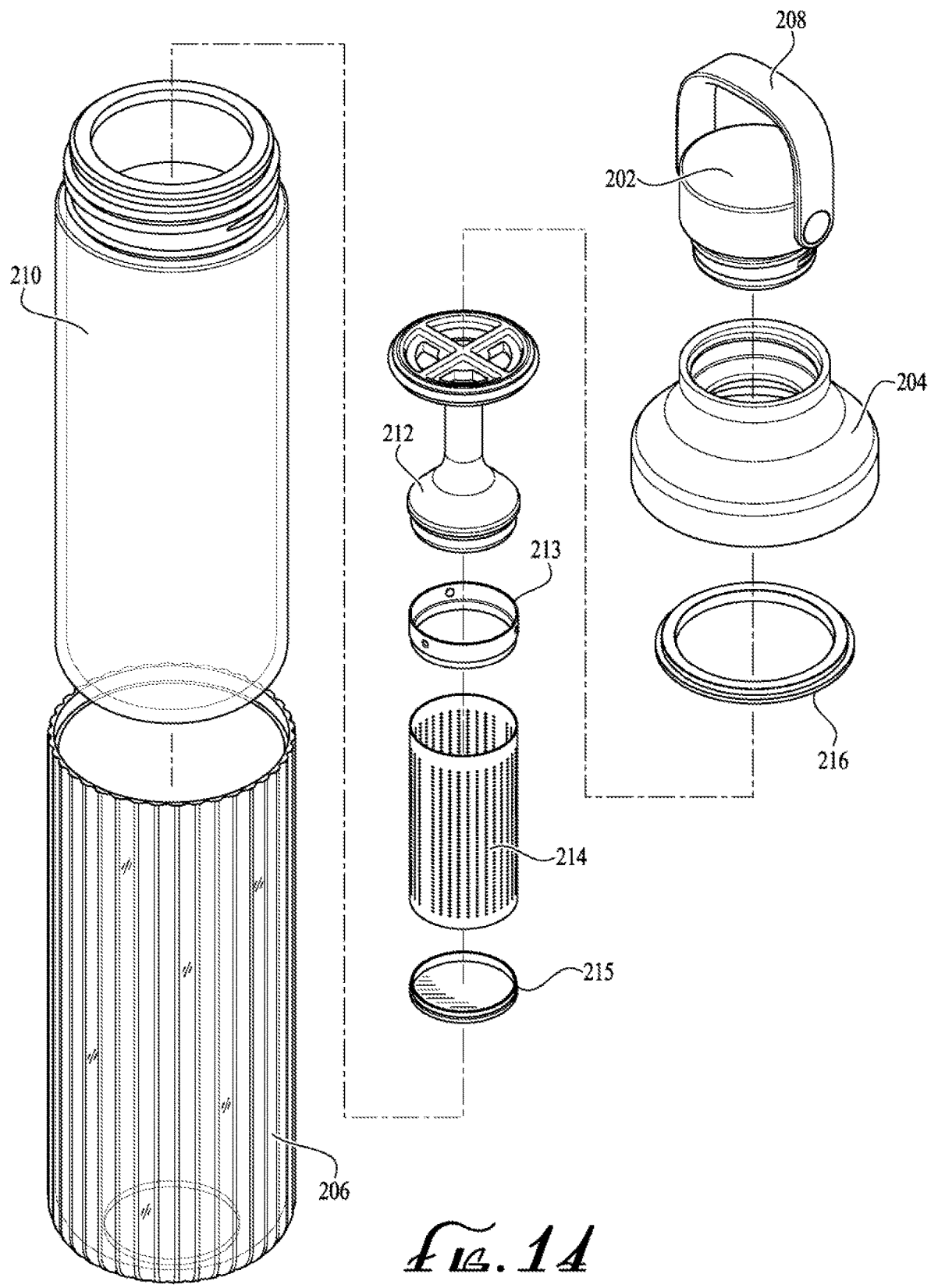
FIG. 14 is a perspective exploded view of one non-limiting embodiment of a blender vessel further illustrating one potential configuration of an infusion assembly.

FIGS. 12, 13 and 14 illustrate an infusion system 200. Shown in FIGS. 12 and 13 are a cap 202, a lid 204, a silicone wrap 206, and the handle 208. The handle 208 may be convenient for transportation. The silicone wrap 206 may be made of silicone, or of other soft plastics known and commonly used in the art. The silicone wrap 206 may provide a better grip than glass or plastic alone and may reduce breakage due to dropping or impact with hard objects.

As shown in FIG. 13, removal of the cap 202 allows for liquid to pass from inside the infusion system 200 to the outside of the infusion system 200. Further shown in FIG. 14 are an infusion vessel 210, a chamber mount 212, collar 213, perforated wall 214, end cap 215, and gasket 216. Together, collar 213, perforated wall 214, and end cap 215 form an infusion chamber 211. Infusion chamber 211 may couple with chamber mount via bayonet connection, pressure fitted, or by threading. The perforated wall 214 has as illustrated, has several perforations 219 which permit liquid to pass through the perforated wall 214, in both an inward and outward direction so that infusion of a given liquid may occur. The perforations 219 are small enough such that no contents of the perforated wall 214 may exit, besides those which may pass through the perforations 219. This may permit a high degree of total liquid infusion and allows a user to consume the liquid contents of the infusion vessel 210 without having solid matter also being consumed.

Still referring to FIGS. 12, 13 and 14, the portions of the cap 202 may be made from durable plastics common to the industry. Further, the cap 202 and the handle 208, may be made of silicone which may be molded over plastic, or only silicone. Moreover, the handle 208 may utilize inserts made of plastic which may insert into two ends of the cap 202. These plastic inserts may be over-molded with silicone and may provide a weight-bearing point for the handle 208 which is contemplated to remain flexible and be produced of durable and flexible materials. The cap 202 may be threaded on one end to permit secure attachment to the infusion system 200. Other portions of the infusion system are contemplated to be made from a wide variety of materials. For example, the infusion vessel 210 is contemplated to be made of glass, borosilicate glass, or a variety of hard and durable plastics, for example, copolymers, and other thermoplastics, or a combination therein. The perforated wall 214, the chamber mount 212, collar 213, and end cap 215 may be contemplated to be made of a variety of durable and inert metals, for example, stainless steel. The chamber mount 212 may be further contemplated to be made of other durable and inert materials, for example, copolymer, other thermoplastic, ceramic, or a combination therein.

Figure 15:
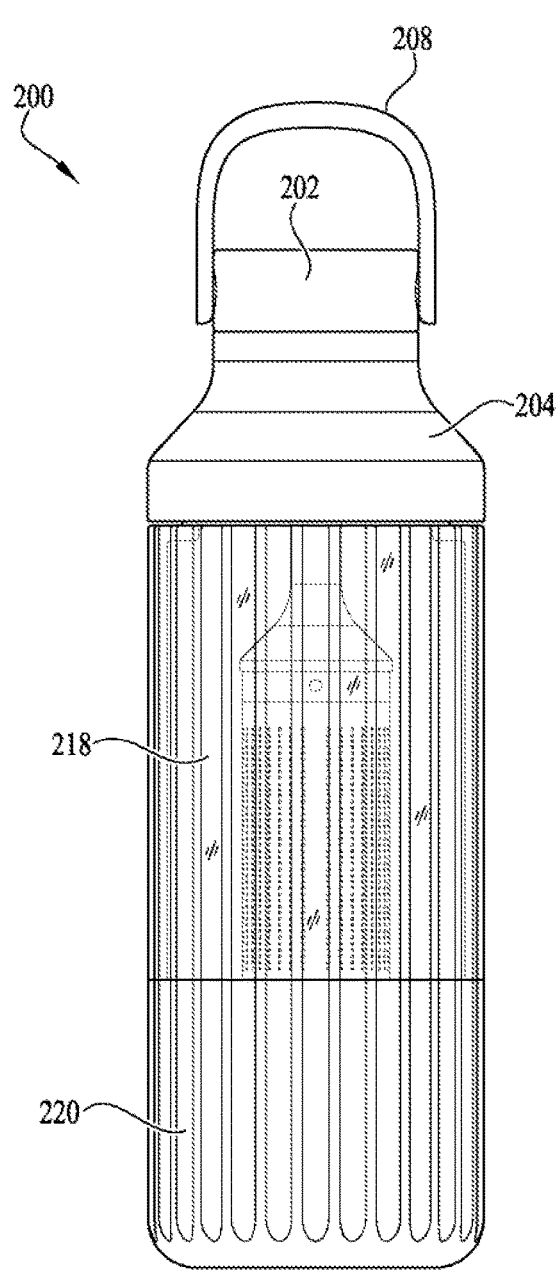
FIG. 15 is a side view of one non-limiting embodiment of a blender vessel further illustrating one potential configuration of an infusion assembly.
Figure 16:
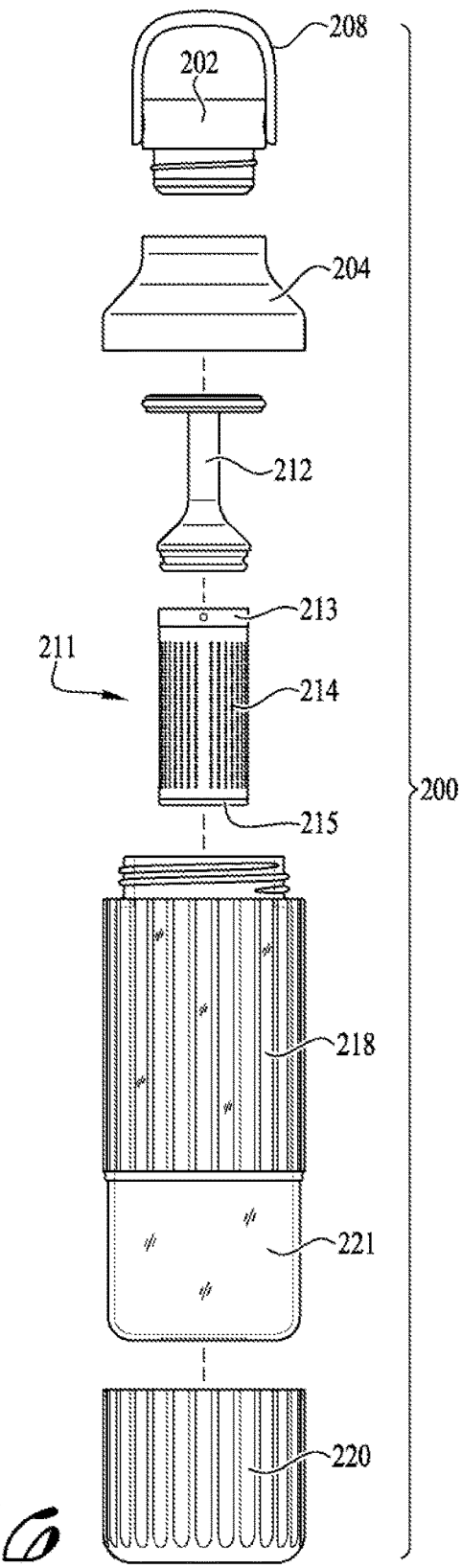
FIG. 16 is an exploded side view of one non-limiting embodiment of a blender vessel further illustrating one potential configuration of an infusion assembly.

Shown in FIGS. 15 and 16 are additional potential embodiments to the infusion system 200. Still shown from prior FIGS. 12 and 13 are cap 202, lid 204, and strap 208. Further potential embodiments illustrated in FIGS. 15 and 16 include a sectional embodiment of the previously discussed silicone wrap 206 (not shown). Accordingly, illustrated here is an upper portion 218 and lower wrap 220. It may further be contemplated that the upper portion 218 and the lower portion 221 may form a unibody construction and may be manufactured from glass or other durable and inert materials, for example, copolymer, other thermoplastic, ceramic, borosilicate glass, or a combination therein.

The advantages of having a sectional assembly as illustrated may include enhanced viewing of the internal liquid as the infusion process unfolds. Further, it is contemplated that the infusion vessel 210 may be used with the blade assembly 106 and blender base assembly 104 (shown in FIG. 1) as previously described. Having a removable lower wrap 220 may permit a user of the blending device 100 to view contents as blending occurs, or to monitor the infusion process as it unfolds subsequent to blending. It is further contemplated that the blender vessel 102 (illustrated in FIG. 1) may be modified to reflect a similar sectional silicone wrap including the upper portion 218 and the lower wrap 220, or may employ a singular silicone wrap type design such as silicone wrap 206 (shown in FIG. 14).

Figure 17:
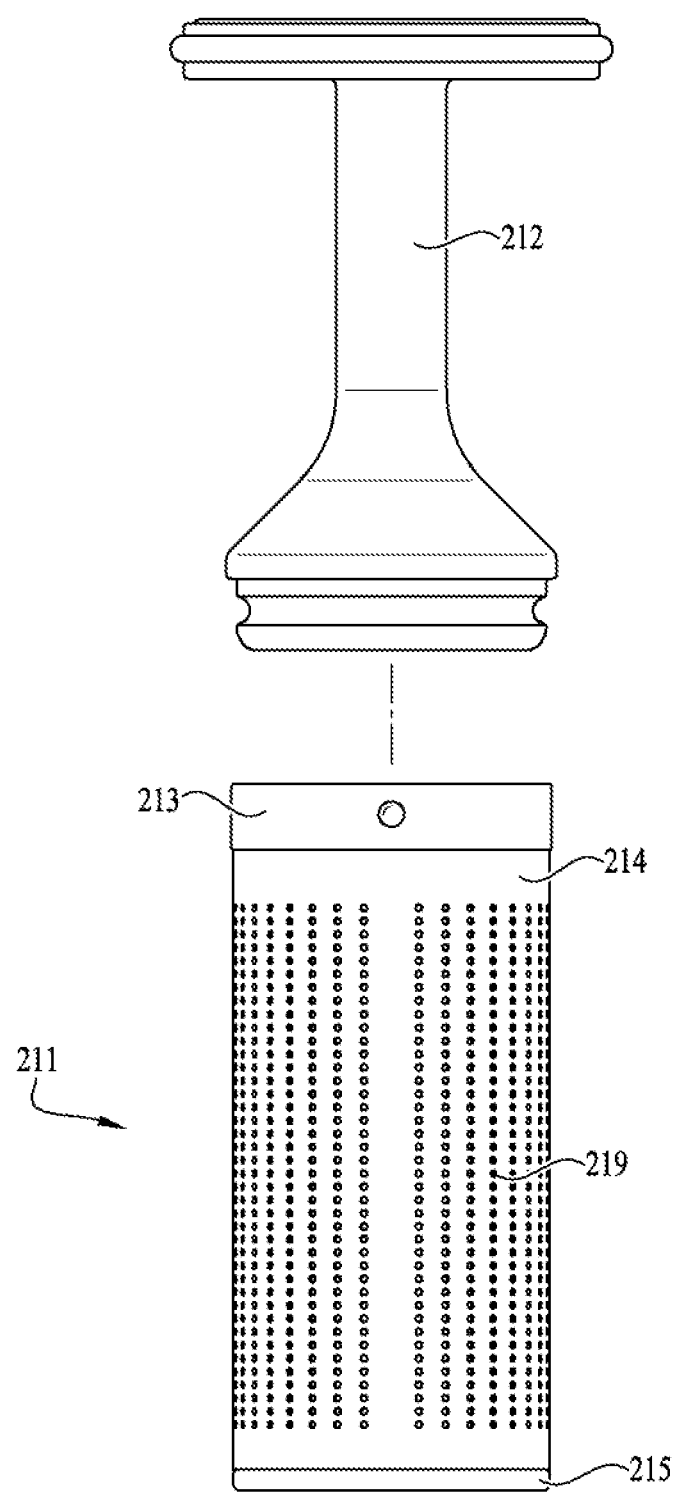
FIG. 17 is an exploded side view of one non-limiting embodiment of internal components of an infusion assembly.

Specifically referring to FIG. 16, illustrated is the removal of lower wrap 220 from the infusion system 200. As noted, it is contemplated that the particular embodiment may be constructed of one piece of glass with the upper portion 218 having a textured outer surface while the lower portion 221 may remain smooth to the outer surface. The glass for use is contemplated to be borosilicate or any other commonly known glass with a similar hardness rating and good durability. Further illustrated is an additional embodiment of the components of the infusion system 200. Shown is the chamber mount 212, the perforated wall 214, and end cap 215 in an assembled configuration, representing the infusion chamber 211. Infusion chamber 211 may be configured such that it may be ready to mate to the chamber mount 212 via bayonet, thread, pressure fit, or any other commonly understood connection method. FIG. 17 illustrates an enlarged view of the chamber mount 212, the collar 213, perforated wall 214, and end cap 215. Well illustrated are perforations 219 and the infusion chamber 211 as assembled.

Figures 18, 19:
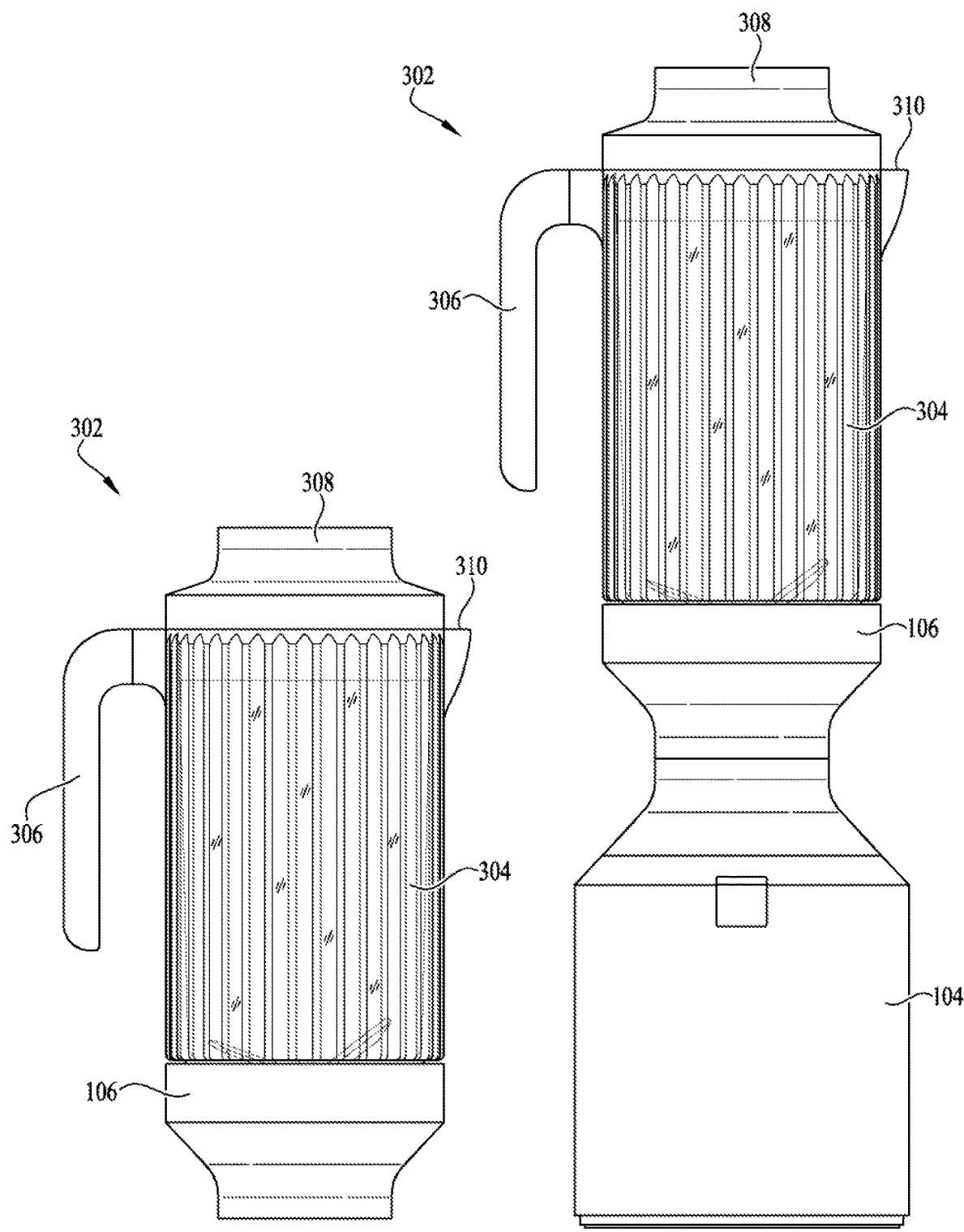
FIG. 18 is a side view of one non-limiting embodiment of a blender vessel representing a pitcher type configuration in a mated configuration with a blade assembly.
FIG. 19 is a side view of one non-limiting embodiment of a blender vessel representing a pitcher type configuration as mated with a blade assembly and a blender base.

FIGS. 18 and 19 illustrate additional potential embodiment to blending device 100, specifically further embodiments for vessel attachments to the blender base assembly 104. Shown is pitcher vessel 302. Relevant portions shown in FIG. 18 include pitcher body 304, pitcher handle 306, pitcher lid 308, and pour spout 310. Further, and of particular importance, FIG. 19 illustrates that multiple potential embodiments exist which may be configured to operate with blender base assembly 104 and blade assembly 106 as shown. The preceding discussion regarding the electronic interlock system 151 and its operation with the blender vessel 102 (shown in FIG. 1) are applicable with the pitcher vessel 302, as well as infusion vessel 210 (shown in FIG. 14). One potential alteration when contemplating the use of pitcher vessel 302 would be the ease of pouring blended material from pour spout 310 rather than having to remove blade assembly 106 from bottom. One particular advantage of the present disclosure should be evident, the blender base assembly 104, blade assembly 106, and other contemplated components of the blending device 100 are readily modified to suit a wide variety of needs desired by the end consumer. Such versatility presents an improvement over the prior art.

Figure 20:
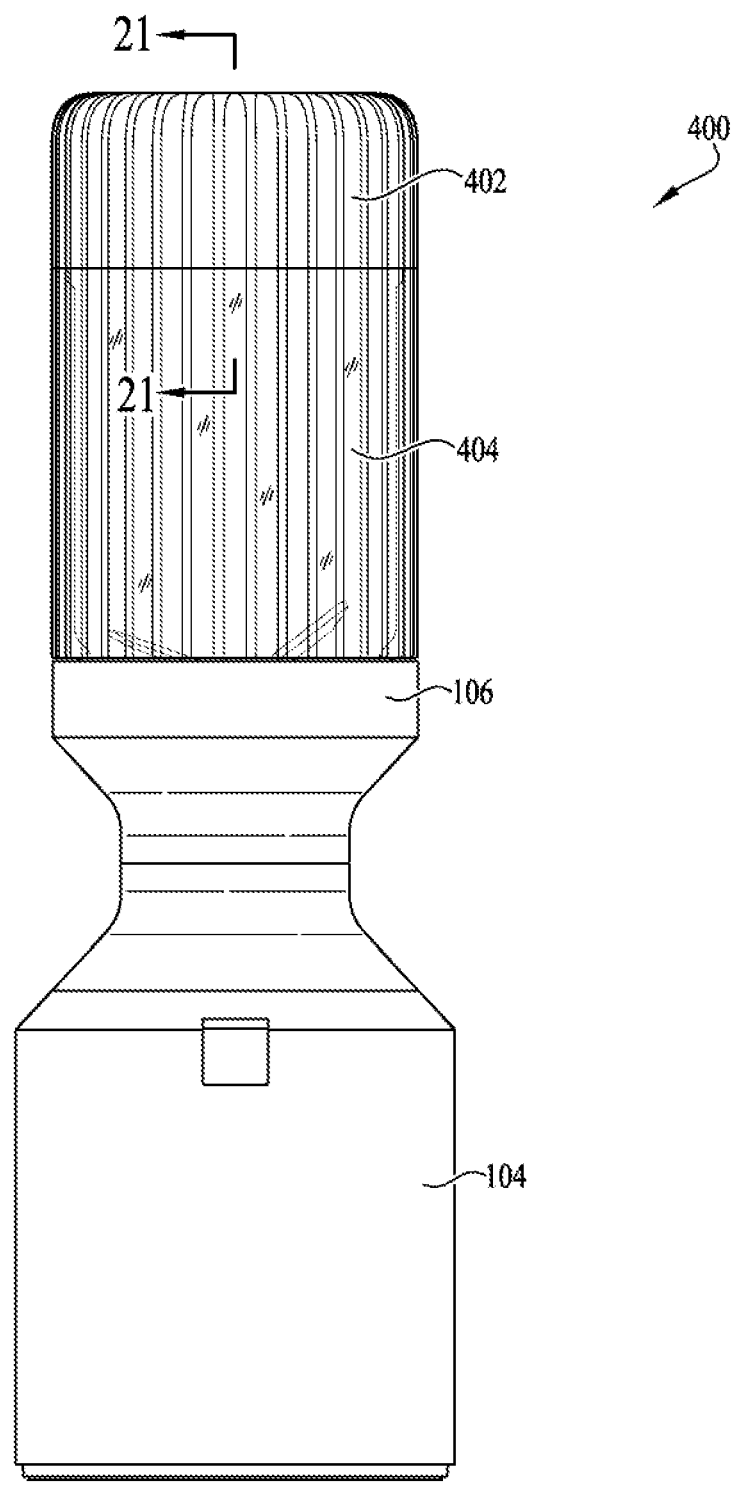
FIG. 20 is a side view of one non-limiting embodiment of a blender vessel representing an alternative embodiment of a blender vessel.
Figure 21:
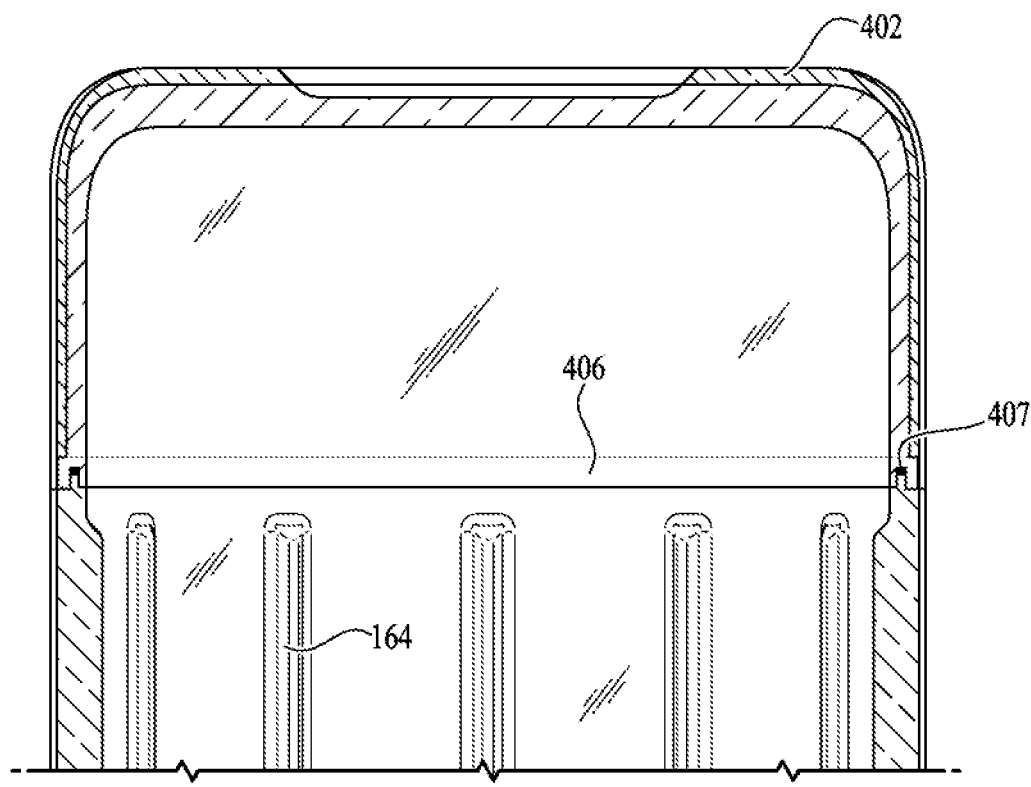
FIG. 21 is a top view of one non-limiting embodiment of a blender vessel representing a view window of an alternative embodiment of a blender vessel.
Figure 22:
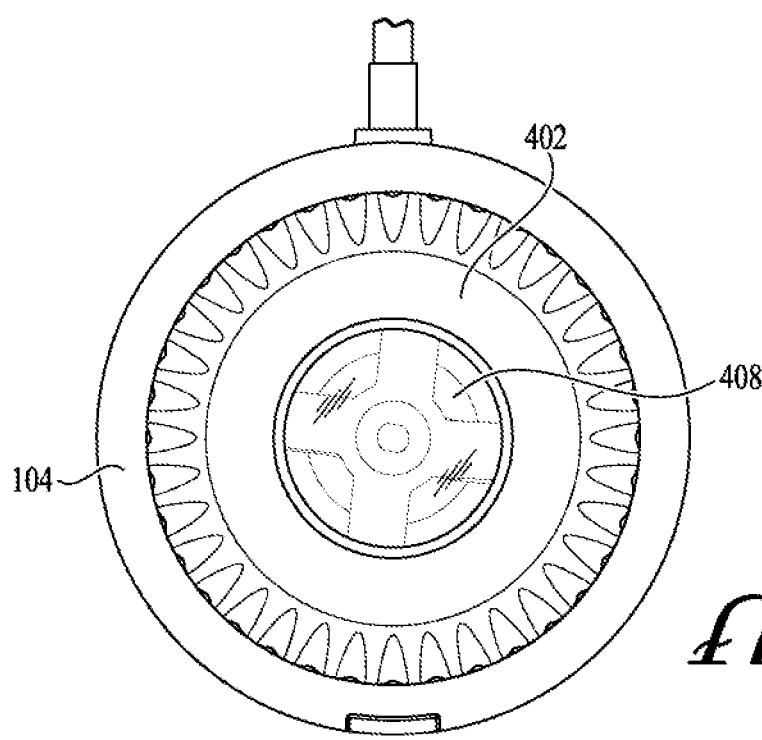
FIG. 22 is an enlarged side view of a portion of one non-limiting embodiment of a blender vessel representing an alternative embodiment of a blender vessel.

FIGS. 20, 21, and 22 illustrate alternative embodiments of the blender vessel 102 here identified as a welded vessel 400. Shown here is an opaque section 402 on the closed end of the welded vessel 400 with a larger transparent section 404 closer to the blender base assembly 104 and blade assembly 106. Said sections may be that of silicone, thermoplastic, copolymer, or that of a wide variety of polyurethane plastic commonly used in the industry or a combination thereof FIG. 21 shows a weld joint 406 at approximately the same location as the end of the opaque section 402. Here, it should be noted that in this embodiment, ribs 164 may not extend to the farthest extent possible internal of the welded vessel 400 and may terminate prematurely and not extend past weld joint 406. By not permitting ribs 164 to traverse the entire length of welded vessel 400, the process of welding the two halves together at weld joint 406 may be simplified. Further, having a portion of weld vessel 400 with no ribs 164 may potentially secondarily enhance viewing of the blending process. Said viewing may be further added to in conjunction with view window 408 as illustrated in FIG. 22 which provides adequate top-down viewing of the blending process even though the opaque section 402 may be opaque.

As illustrated in the FIGS. 20, 21, and 22, it is contemplated that the opaque section 402 may be removable from the lower end of welded vessel 400. It is further contemplated that transparent section 404 may likewise be removable from welded vessel 400. Alternatively, opaque section 402 and transparent section 404 may be permanently affixed to the external portion of welded vessel 400. The weld joint 406 may be produced via induction welding of two separate pieces of copolymer plastic or that of other thermo-plastics common and known in the industry. Said weld joint 406 may be performed by the use of an induction ring 407. Induction ring 407 may be made of stainless steel, or other commonly used material for welding two articles of plastic, thermoplastic, or other types of material.

Figure 23:
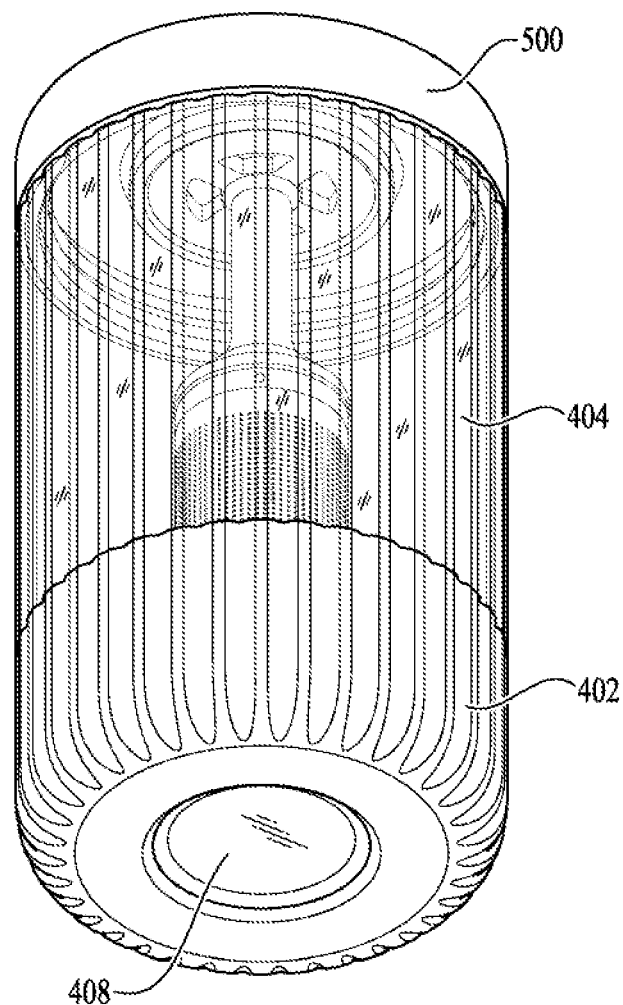
FIG. 23 is a perspective view of one non-limiting embodiment of a blender vessel representing a storage lid and further configured with an infusion system attached; and, FIG. 24 is an exploded perspective view one non-limiting embodiment of a blender vessel representing a storage lid with an infusion system.
Figure 24:
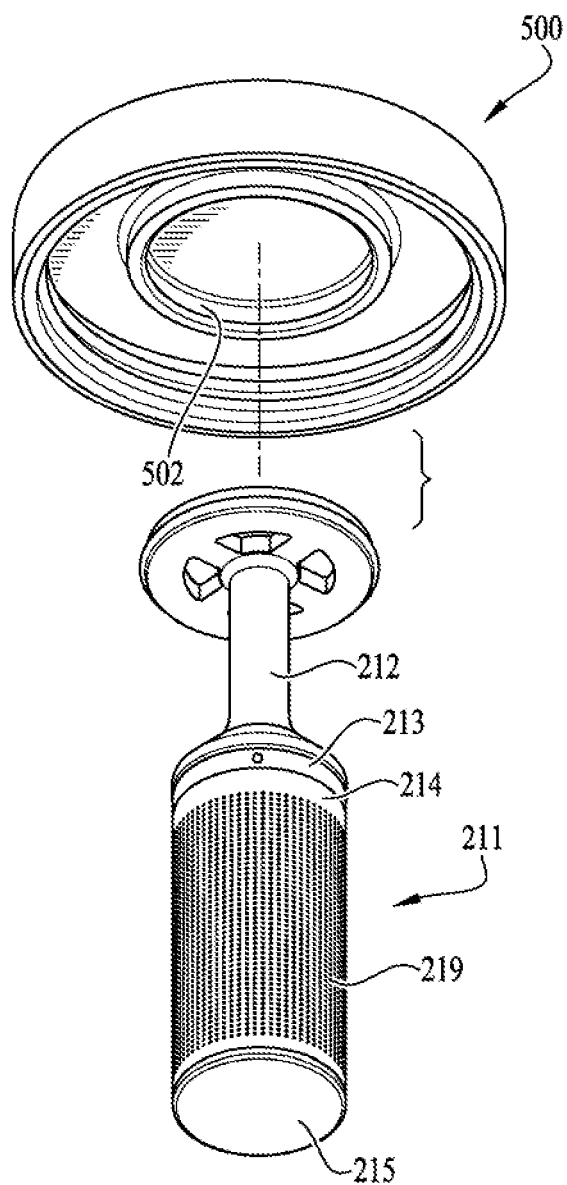

Illustrated in FIGS. 23 and 24 are that of one potential embodiment for an infusion lid system 500. Relevant portions of the infusion lid system 500 include the attachment ring 502 to the underside of the infusion lid system 500. Shown in FIG. 23 is how one particular embodiment of a vessel (shown here as the welded vessel 400) may attach and function with the chamber mount 212 and infusion chamber 211. FIG. 24 illustrates how the chamber mount 212 may mate with attachment ring 502 to the underside of the infusion lid system 500.

Having disclosed the structure of the preferred embodiments, it is now possible to describe its function, operation, and use of a blending device 100 and the infusion system 200.

Blending device 100 is contemplated for use with a wide variety of foods and other ingestible materials. A user of blending device 100 may remove blender vessel 102 from blade assembly 106 and place blender vessel 102 upside down such that the view port 112 is downward from the perspective of a user. The user then may fill the blender vessel 102 with desired contents for blending, for example, ice, fruit, grain, liquids, and a variety of other options. The user may then place blade assembly 106 over the blender vessel 102 and rotate the blade assembly 106 to engage a thread between the blender vessel 102 and the blade assembly 106. Once the blender vessel 102 and the blade assembly 106 are no longer rotatable and are thus secured to each other, the user then may rotate the combined blade assembly 106 and blender vessel 102 over such that the view port 112 is nearest the user from the perspective of the user. The user may place the combined blade assembly 106 and blender vessel 102 over the blender base assembly 104.

As discussed, the orientation of the blade assembly 106 over the blender base assembly 104 may be immaterial, as the locking protrusions 122 may glide past the bayonet connectors 120 to auto-align the combined blade assembly 106 and blender vessel 102 onto the blender base assembly 104. A final twist in a locking direction of the blade assembly 106 in relation to the blender base assembly 104 may then be performed. Said locking direction may be to the left or the right. Said final twist may align the blade interlock contacts 128 and the base interlock contacts 130 such that a complete circuit is formed and may lock the locking protrusions 122 under the bayonet connectors 120 for stable operational use. The user may then press the power cut switch 160 to provide the initial power to the blending device 100. The status indicator 110 may indicate, via a predetermined color, that the blending device 100 is ready for blending.

The user may then select to fully press the power switch 108 to activate the blending device 100 for a predetermined measure of time. The power switch 108 is contemplated to operate in a continuous fashion by two different methods. First, a user may depress power switch with a measured time hold, by way of example, depression of power switch 108 for 1 or 2 seconds. Second, a user may fully depress the power switch 108 with no amount of measured time, for example, a simple press of the power switch 108.

The user may also have the option to pulse the contents of the blender vessel 102 by partial depression of the power switch 108. Such partial depression of the power switch 108 is contemplated in the second situation addressed above. It is further contemplated that in the first situation wherein the blending device 100 is activated by depression of power switch 108 by measured time hold, that a similar full depression and quick release of the power switch 108 may activate a pulse function when depressed for less time than required to start a timed cycle.

After a desired consistency of the blended material is completed by the user, the user then may twist the blade assembly 106 in relation to the blender base assembly 104 such that the locking protrusions 122 are no longer blocked by the bayonet connectors 120. Further, this may disconnect the blade interlock contacts 128 and the base interlock contacts 130 such that the circuit is broken, and the blending device 100 cannot operate accidentally. The user may then invert the combined blender vessel 102 and blade assembly 106 and disconnect the blade assembly 106 from the blender vessel 102.

The electronic interlock system 151 as illustrated in FIG. 9 may represent an important safety feature of the blending device 100. Accordingly, the threading of the blender vessel 102 onto the blade assembly 106 and subsequent depression of the compressive contact 150 indicates to the blending device 100 that the blender vessel 102 is properly fitted to the blade assembly 106. Further, the contact made between the blade interlock contacts 128 and the base interlock contacts 130 may indicate to the blending device 100 that the blender vessel 102, the blade assembly 106, and the blender base assembly 104 are all properly aligned such that operation may commence. The first logic circuit element 140, the second logic circuit element 141, indicator logic circuit element 153, and the housing logic circuit element 152, may aid in this communication by blocking attempted operation wherein one or more signals are not detected. For example, if the blade assembly 106 and the blender base assembly 104 are properly aligned, but the blender vessel 102 is not signaling by way of the compressive contact 150 to one or more printed computer boards that the blender vessel 102 is in place, then the blending device 100 may not operate. Moreover, this may be true of the entire electronic interlock system 151. Any identified one or more than one logic circuit element or printed computer board throughout this disclosure may be programmed to perform all, one, none, or a wide variety of functions as related to blending.

The electronic interlock system 151 may receive power from an external power source via power source 138, or another means, and the internal components may then complete a circuit. The signal that the blender vessel 102 and the blade assembly 106 may be properly connected may be completed by the compressive contact 150. The signal that the blade assembly 106 and the blender base assembly 104 are properly connected may be completed by the alignment of the blade interlock contacts 128 and the base interlock contacts 130. The detection of an appropriate operational temperature is detected by thermal detector 154 and signal for operational temperature may be conducted along the blade interlock contact 128 and base interlock contact 130 points as well. Without each of these signals sent to the housing logic circuit element 152, the first logic circuit element 140, the infusion system 200, or the second logic circuit element 141, the blending device 100 may not operate and blend may not occur and the motor 132 may not activate. Failure of any of these connections may be represented by the status indicator 110 as a variety of indicator colors. For example, red may indicate that a thermal maximum is close, while a flashing red may indicate that the thermal maximum has been reached or exceeded; however, any variety of color, flashing or otherwise, is contemplated to be used to signal to a user the overall state of the blending device 100. This represents an enhanced safety improvement over previous blenders.

The infusion system 200 may be used in conjunction with prior purchased pouches (not shown) of infusible material or by application of material selected by a user. Said prior purchased pouches may be custom made for the infusion system 200 or may be located through third-party vendors. The user may remove the lid 204 of the infusion system 200. The user may then extract the lower contents of the infusion system 200, including the chamber mount 212 and the infusion chamber 211. The user may then unthread or disconnect the bayonet connectors of the collar 213 from the chamber mount 212 and thus may gain access to the internal portion of the perforated wall 214 and infusion chamber 211. At this point, the user may fill the infusion chamber 211 with any desired contents, from pre-purchased infusion bags to a variety of fruit, or any other potentially contemplated material that may infuse into the liquid. The user may reconnect the collar 213 onto the chamber mount 212. The user may then fill the infusion vessel 210 with a liquid of the users choosing, and place the lid back onto the infusion vessel 210. Removing the cap 202 permits the liquid to exit the infusion system 200 but not the contents of the infusion chamber 211 by way of the small perforation size of the perforated wall 214. The chamber mount 212 is elongated enough such that it holds the infusion chamber 211 into any liquid in the infusion vessel 210. Alternatively, a user may leave the collar 213 attached to the chamber mount and remove the perforated wall 214 and end cap 215. It is contemplated that the use of collar 213 may enable more rapid removal of chamber mount 211 from the system by way of using, for example, bayonet type connections between the collar 213 and perforated wall 214. The collar 213 may further thread, pressure fit, snap, or may bayonet to the chamber mount. It is further contemplated that collar 213, perforated wall 214, and end cap 215 may be permanently adhered, welded, or bonded together to form one functional unit referred to as infusion chamber 211.

One particular advantage of the chamber mount 212 is well illustrated in FIGS. 15 and 23. The chamber mount 212 as illustrated may be thought of as an arm, and thus a prominent feature may be that of an extension between where it mounts to any particular lid and the position of the infusion chamber 211 internal to any vessel. Accordingly, the chamber mount 212 positions the infusion chamber 211 downward and into any given body of liquid meant for infusion with infusible materials. Thus, as a user consumes a partial volume of infused liquid, the infusion process may continue due to the continuous contact of the infusion chamber 211 with a given volume of infusible liquid.

One preferred aspect of the present disclosure may be the concept of the blending device 100 as it may relate to an infusion system 200. The blender base assembly 104 may be readily used in tandem with any embodiment of an infusion vessel 210, discussed herein or further contemplated. The infusion vessel 210, blender vessel 102, welded vessel 400, or infusion lid system 500 in combination with the infusion chamber 211 and chamber mount 212 may form a system in which daily hydration needs are readily accessible and pleasurable to maintain. A user may pulse selected ingredients (by way of example, vegetable, herbs, fruits, etc.) enough to break the skin of the ingredient. Such pulsing may render the pulsed ingredients in a state which is more suitable for use in the infusion system 200. After blending, a user may place the blended ingredients into the infusion chamber 211 and then may place the infusion chamber 211 back in the same vessel (blender vessel 102, infusion vessel 210, or weld vessel 400) used for blending. A user may then fill the vessel (blender vessel 102, infusion vessel 210, or weld vessel 400) with liquid (for example, water) and infuse said ingredients using lid 204, infusion lid system 500, or any other contemplated embodiment. The infusion chamber 211 may attach to lid 204 or infusion lid system 500 and the user may then leave undisturbed to infuse or may travel to other locations with an assembled infusion system 200 while allowing the infusion to proceed while traveling. No other steps may be necessary and the user may thus be able to use the same vessel (blender vessel 102, infusion vessel 210, or weld vessel 400) previously used for blending the infusion ingredients. Because the infusion system 200 comes equipped with a drinking lid (lid 204 or infusion lid system 500), a user may hydrate for long periods using the same infused ingredients or may create a new infusion by pulsing fresh ingredients. As such, the blending device 100 may be considered akin to an appliance that assists with active and pleasurable hydration and is versatile with a number of parts which may be readily exchanged with each other.

Further, there may aesthetic advantages to the disclosure and the several embodiments discussed herein. View port 112 and view window 408 may enhance the blending process by allowing users of the blending device 100 to have a superior top-down viewing of the blending process, which is unobstructed, may lend itself well to image sharing via social media or other outlets. Moreover, in some embodiments, this aspect may be enhanced, for example, with the use of the opaque section 402 in a removed configuration with the welded vessel 400. The optical clarity of copolymers, in addition to a section of the welded vessel 400 which may not have ribs 164, may allow users to readily view, photograph, and record videos of their favorite blending processes. This may be enhanced in an embodiment of welded vessel 400 wherein the opaque section 402 is contemplated to be removable.

This disclosure herein may relate to a blending device 100 which may comprise a blender vessel 102, a blade assembly 106, a blender base assembly 104, and a thermal detector 154. The thermal detector 154 may be configured to be in detective proximity with a matter being blended. The matter being blended may include a wide variety of foodstuffs, liquids, and/or solids, meant for human consumption.

The blade assembly 106 may include a blade interlock contact 128 and a compressive contact 150. The compressive contact 150 may be resiliently biased to a non-communicative configuration. The blender vessel 102 may be configured to compress the compressive contact 150 to a communicative configuration when the blender vessel 102 is engaged with the blade assembly 106 in a reversible fashion.

The blender base assembly 104 may further include a base interlock contact 130 and a motor 132. The blade assembly 106 may be configured to releasably mount to the blender base assembly 104 and may, thereby, bring the base interlock contact 130 and the blade interlock contact 128 into electrical communication with each other.

Accordingly, the motor 132 may be obstructed from being in electricity-receiving communication with a power source 138 unless three conditions are met. First, the compressive contact 150 may be required to be in the communicative configuration. Second, the base interlock contact 130 and the blade interlock contact 128 may need to be in the electrical communication. Third, the thermal detector 154 may need to detect a temperature below a preset thermal maximum.

Additionally, the blade assembly 106 may further include a housing logic circuit element 152 which may be configured to electronically detect the reversible engagement between the blender vessel 102 and the blade assembly 106. The housing logic circuit element 152 may further be configured to be in electronic communication with the thermal detector 154 and therein electrically detect the temperature readings therein.

Additionally, the blender base assembly 104 may further include a first logic circuit element 140 which may be configured to electronically detect the adjacent electrical communication between the base interlock contact 130 and the blade interlock contact 128, and a second logic circuit element 141 which may be configured to be in electronic communication with the first logic circuit element 140, the housing logic circuit element 152, and the compressive contact 150.

Additionally, the blender base assembly 104 may further include a power switch 108, a power cut switch 160, and a power source 138. The power source 138 may be configured to supply an external electromotive force, the power cut switch 160 may be configured to function as a gate and permissibly permit electrical power to energize the interlock assembly.

Additionally, the blender base assembly 104 may further include an indicator logic circuit element 153, a status indicator 110, and a light pipe. The status indicator 110 may be further configured to provide a color-coded status indication of an operative status of the interlock system 151 and the status indicator 110 may be in visual communication with the indicator logic circuit element 153 via a light pipe 155.

Additionally, the blending device 100 may have the power switch 108 in a configuration suitable to engage a preset programming functionality programmed into the first logic circuit element 140, the second logic circuit element 141, the indicator logic circuit element 153, or the housing logic circuit element 152.

Additionally, the blending device 100 may have the thermal detector 154 in a configuration suitable to be in direct contact with foodstuffs when the blender vessel 102 is reversibly engaged with the blade assembly 106. The thermal detector 154 thermal maximum may be set to any point between a range of 40 to 80 degrees centigrade.

This disclosure may also describe a food processing device 100 (additionally referred to as a blending device 100), which may have an electrical interlock system 151 which may be comprised of a blender vessel 102 and a blade assembly 106. The blade assembly 106 may have a housing logic circuit element 128, a compressive contact 150, and a blade interlock contact 128. The blender vessel 102 may be configured to reversibly engage with the compressive contact 150, and the compressive contact 150 may be biased to an off configuration when not reversibly engaged to the blender vessel 102, and biased to an on configuration when reversibly engaged to the blender vessel 102.

Additionally, the said reversible engagement may cause the compressive contact 150 to transition from an off to an on configuration. The transitioning may permit an electric signal to be transmissible to the housing logic circuit element 152. The blade assembly 106 may further have a thermal detector 154. The thermal detector 154 may be located in detective proximity with a blending matter and configured to be in electrical communication with the housing logic circuit element 152.

Said food processing device 100 may further include a blender base assembly 104 which may have a motor 132, a base interlock contact 130, and a one or more than one logic circuit element, the blender base assembly 104 may be configured to a reversibly couple with the blade assembly 106. The reversible coupling may result in the blade interlock contact 128 being in electronic communication with the base interlock contact 130.

Said food processing device 100 may further utilize a motor 132 which may be operable only when the compressive contact 150 is configured to on, the thermal detector 154 registers a temperature below a thermal maximum, and the blade interlock contact 128 and base interlock contacts 130 are in the aforementioned electronic communication with each other.

The food processing device 100 may further configure the thermal detector 154 to have a thermal maximum set between a range of 40 to 80 degrees centigrade.

The food processing device 100 may further configure one or more than one logic circuit element to be programmed to cut power from a power cut switch 160 if it is not placed into an operable configuration. Additionally, the one or more than one logic circuit element may be configured to be programmable with preset operative responses to a user's input commands.

Additionally, the blender base assembly 104 may further comprise an indicator logic circuit element 153 for the operative electrical control of a status indicator 110. The status indicator 110 may be connected to the indicator logic circuit element 153 with a light pipe 155 therein and further configured to indicate the operability status of the motor 132. The status indicator 110 may further provide color-coded visual feedback for indicating a selected programmable operative response requested by the user.

This disclosure herein may further relate to a blending device 100 interlock system 151 assembly, the interlock system 151 may comprise a blender base assembly 104 which may have a base interlock contact 130, a first logic circuit element 140, a second logic circuit element 141, and a motor 132. A blade assembly 106 may have a thermal detector 154, a blade interlock contact 128, a housing logic circuit element 152, and a compressive contact 150. The compressive contact 150 may be resiliently biased to a non-conductive configuration.

Additionally, the blending device 100 may include a blender vessel 102 which may have a circumferential wall which may extend from a viewport 112 to a threaded end 107. The open end may be configured to reversibly threadably engage with the blade assembly 106. The reversibly threadably engagement may compressively transition the compressive contact 150 from the non-conductive configuration to a conductive configuration and may result in a conductive signal being transmissible to the housing logic circuit element 152.

Additionally, the blending device 100 may further be configured such that the blender base assembly may rotatably engage with the blade assembly 106. Such a rotatable engagement may cause the blade interlock contact 128 and the base interlock contact 130 to be in electrical contact. The electrical contact may result in an energetic signal being transmissible to the first logic circuit element 140 and the second logic circuit element 141.

Additionally, the blending device 100 may include the motor 132 configured in such a manner that it may become operable when the following combination is satisfied: the reversibly threadably engagement of the blender vessel 102 with the blade assembly 106 occurs, the rotatable engagement of the blade assembly 106 onto the blender base assembly 104 occurs; and the thermal detector 154 operatively confirms contents of the blender vessel 102 are below a preset temperature threshold.

Additionally, the second logic circuit element 141 may be programmed to prohibit electromotive power sourced from a power supply 138 if the combination is not satisfied. The second logic circuit element 141 may further be programmable with operative responses to a user's input commands through a power switch 108.

Additionally, the blender base assembly 104 may further comprise an indicator logic circuit element 153 for the operative control of a status indicator 110. The status indicator 110 may be connected to the indicator logic circuit element 153 with a light pipe 155 and may further be configured to indicate the operability status of the motor 132. The status indicator 110 may further provide color-coded visual feedback and further indicating a selected programmable operative response requested by the user.

Additionally, the thermal detector 154 is in direct contact with foodstuffs when the blender vessel 102 is reversibly threadably engaged with the blade assembly 106.

While embodiments of the disclosure have been illustrated and described, it is not intended that these embodiments illustrate and describe all possible embodiments of the disclosure. Rather, the words used in the specification are words of description rather than limitation, and it is understood that various changes may be made without departing from the spirit and scope of the disclosure.

Accordingly, it is not intended that the disclosure be limited except by the appended claims. Insofar as the description above and the accompanying drawings disclose any additional subject matter that is not within the scope of the claims below, the embodiments are not dedicated to the public and the right to file one or more applications to claim such additional embodiments is reserved.

What is claimed is:

1. A blade holder for a blending device comprising:
a housing configured to be detachably secured to a vessel and a base;
at least one blade configured to mix a blending material within the vessel when the vessel is secured to the housing and when the housing is detachably secured to the base;
a logic circuit element configured to electronically communicate with the base via at least one electrical contact when the housing is detachably secured to the base;
at least one thermal detector positioned to contact the blending material within the vessel when the vessel is secured to the housing; and
at least one compressive contact resiliently biased to a non-communicative configuration, wherein the at least one compressive contact is moveable to a communicative configuration when the vessel is secured to the housing, and wherein the communicative configuration enables electronic communication between the logic circuit element and the at least one thermal detector, and
wherein the at least one thermal detector is configured to detect a temperature of the blending material when the vessel is secured to the housing and when the logic circuit element is in electronic communication with the base and the at least one thermal detector.

2. The blade holder of claim 1, wherein the at least one thermal detector, together with the logic circuit element when the logic circuit element is in electronic communication with the base and the at least one thermal detector, is configured to detect if the temperature of the blending material satisfies a temperature threshold; and
upon determining that the temperature of the blending material satisfies the temperature threshold, the logic circuit element transmits a signal to the base to prevent activation of a motor within the base.

3. The blade holder of claim 2, wherein the temperature threshold is between 50 to 70 degree Celsius.

4. The blade holder of claim 1, wherein the logic circuit element comprises a printed circuit board positioned within the housing.

5. The blade holder of claim 1, wherein the at least one thermal detector is a thermistor.

6. A vessel assembly for a blending device comprising:
a vessel configured to hold a blending material within an interior of the vessel;
at least one blade positioned within the interior of the vessel, wherein the at least one blade is configured to mix the blending material;
at least one thermal detector positioned at least partially within the interior of the vessel to contact the blending material held within the interior of the vessel;
a logic circuit element configured to electronically communicate with a base via at least one electrical contact when the vessel assembly is detachably secured to the base; and
at least one compressive contact resiliently biased to a non-communicative configuration, wherein the at least one compressive contact is moveable to a communicative configuration when the vessel is secured to the base, and wherein the communicative configuration enables electronic communication between the logic circuit element and the at least one thermal detector, and
wherein the at least one thermal detector is configured to detect a temperature of the blending material when the logic circuit element is in electronic communication with the base and the at least one thermal detector.

7. The vessel assembly of claim 6, additionally comprising a blade holder detachably secured to the vessel; and
wherein the at least one blade, the at least one thermal detector, and the logic circuit element are positioned within the blade holder.

8. The vessel assembly of claim 7, wherein the blade holder defines a lower wall, and wherein:
the at least one blade extends through the lower wall; and
the at least one thermal detector is at least partially embedded within the lower wall.

9. The vessel assembly of claim 8, wherein the lower wall of the blade holder and the interior of the vessel collectively form a sealed enclosure when the blade holder is detachably secured to the vessel.

10. The vessel assembly of claim 6, wherein the at least one thermal detector, together with the logic circuit element when the logic circuit element is in electronic communication with the base and the at least one thermal detector, is configured to detect if the temperature of the blending material satisfies a temperature threshold; and
upon determining that the temperature of the blending material satisfies the temperature threshold, the logic circuit element transmits a signal to the base to prevent activation of a motor within the base.

11. The vessel assembly of claim 10, wherein the temperature threshold is between 50 to 70 degree Celsius.

12. The vessel assembly of claim 7, wherein the logic circuit element comprises a printed circuit board positioned within the blade holder.

13. The vessel assembly of claim 6, wherein the at least one thermal detector is a thermistor.

14. A vessel assembly for a blending device comprising:
a vessel defining an open end and a closed end, wherein the vessel defines an interior between the open end and the closed end;
a blade holder comprising:
a housing configured to detachably secure the blade holder to the open end of the vessel and configured to detachably secure the blade holder to a base of the blending device;
at least one blade configured to mix a blending material within the interior of the vessel;
a logic circuit element configured to electronically communicate with the base of the blending device when the blade holder is detachably secured to the base;
at least one thermal detector positioned to contact the blending material within the vessel when the vessel is secured to the housing; and
at least one compressive contact resiliently biased to a non-communicative configuration, wherein the at least one compressive contact is moveable to a communicative configuration when the vessel is secured to the housing, and wherein the communicative configuration enables electronic communication between the logic circuit element and the at least one thermal detector, and
wherein the at least one thermal detector is configured to detect a temperature of the blending material when the vessel is secured to the housing and when the logic circuit element is in electronic communication with the base and the at least one thermal detector.

15. The vessel assembly of claim 14, wherein the at least one thermal detector, together with the logic circuit element when the logic circuit element is in electronic communication with the base and the at least one thermal detector, is configured to detect if the temperature of the blending material satisfies a temperature threshold; and upon determining that the temperature of the blending material satisfies the temperature threshold, the logic circuit element transmits a signal to the base to prevent activation of a motor within the base.

16. The vessel assembly of claim 15, wherein the temperature threshold is between 50 to 70 degree Celsius.

17. The vessel assembly of claim 14, wherein the logic circuit element comprises a printed circuit board positioned within the housing.

18. The vessel assembly of claim 14, wherein the at least one thermal detector is a thermistor.

* * * * *